US012661686B2

(12) United States Patent
Mathys et al.

(10) Patent No.: US 12,661,686 B2
(45) Date of Patent: Jun. 23, 2026

(54) DISCHARGE ARRANGEMENT, COMPONENT, ACCESSORY, METHOD OF CONNECTING AN ACCESSORY TO A COMPONENT, AND SYSTEM

(71) Applicant: medmix Switzerland AG, Haag (CH)

(72) Inventors: Beat Mathys, Muri (CH); Martin Veid, Weggis (DE)

(73) Assignee: medmix Switzerland AG, Haag (CH)

( * ) Notice: Subject to any disclaimer, the term of this patent is extended or adjusted under 35 U.S.C. 154(b) by 177 days.

(21) Appl. No.: 17/630,338

(22) PCT Filed: Jul. 28, 2020

(86) PCT No.: PCT/EP2020/071276
§ 371 (c)(1),
(2) Date: Jan. 26, 2022

(87) PCT Pub. No.: WO2021/018891
PCT Pub. Date: Feb. 4, 2021

(65) Prior Publication Data

US 2022/0250111 A1 Aug. 11, 2022

(30) Foreign Application Priority Data

Jul. 29, 2019 (EP) .................................... 19188746

(51) Int. Cl.
*B05C 17/005* (2006.01)

(52) U.S. Cl.
CPC .. *B05C 17/00593* (2013.01); *B05C 17/00509* (2013.01); *B05C 17/00513* (2013.01); *B05C 17/00559* (2013.01)

(58) Field of Classification Search
CPC ........ B05C 17/00553; B05C 17/00506; B05C 17/00513; F16L 37/10; F16L 37/105; F16L 37/234–256

(Continued)

(56) References Cited

U.S. PATENT DOCUMENTS 3,767,085 A * 10/1973 Cannon ............. B05C 17/00566 604/82
4,240,566 A * 12/1980 Bergman ............. B65D 83/761 206/219

(Continued)

FOREIGN PATENT DOCUMENTS

DE 102005041962 B3 3/2007
DE 102010060671 A1 5/2012

(Continued)

OTHER PUBLICATIONS

International Search Report issued Nov. 10, 2020 in corresponding International Application No. PCT/EP2020/071276.

*Primary Examiner* — Paul R Durand
*Assistant Examiner* — Randall A Gruby
(74) *Attorney, Agent, or Firm* — Spencer Fane, LLP

(57) ABSTRACT

A discharge arrangement includes a fluid conducting component having an outlet part, an accessory having an inlet part, and a locking ring, the inlet part of the accessory being releasably attachable to the outlet part of the fluid conducting component. The outlet part includes two or more outlets surrounded by a collar, with an outer surface of the collar having a first rotation constraining member. The inlet part includes two inlets surrounded by a sleeve, the two inlets being complementary to the two outlets of the fluid conducting component to couple the outlets to the inlets to enable a fluid communication between one of the outlets with one of the inlets.

19 Claims, 13 Drawing Sheets

(58) Field of Classification Search
USPC .............. 285/89, 362, 377, 913; 222/153.09, 222/92–107
See application file for complete search history.

(56) References Cited

U.S. PATENT DOCUMENTS

| | | | | |
|---|---|---|---|---|
| 4,538,920 | A * | 9/1985 | Drake | B01F 33/82 222/137 |
| 4,690,306 | A * | 9/1987 | Staheli | B05C 17/0123 222/137 |
| 4,771,919 | A * | 9/1988 | Ernst | B65D 81/325 222/506 |
| 4,838,457 | A * | 6/1989 | Swahl | B65D 47/265 222/548 |
| 4,989,758 | A * | 2/1991 | Keller | B05C 17/00506 222/137 |
| 5,301,842 | A * | 4/1994 | Ritter | B65D 81/325 222/548 |
| 5,413,253 | A * | 5/1995 | Simmen | B05C 17/00553 222/137 |
| 5,443,183 | A * | 8/1995 | Jacobsen | B05C 17/00513 222/137 |
| 5,918,772 | A | 7/1999 | Keller et al. | |
| 5,988,230 | A * | 11/1999 | Black | B05C 17/00553 144/237 |
| 6,161,730 | A * | 12/2000 | Heusser | B05C 17/00553 222/137 |
| 6,443,612 | B1 * | 9/2002 | Keller | B01F 27/112 222/145.6 |
| 6,488,991 | B1 | 12/2002 | Hunter et al. | |
| 6,672,519 | B2 | 1/2004 | Hunter et al. | |
| 6,769,574 | B1 * | 8/2004 | Keller | B05C 17/00509 222/137 |
| 7,497,355 | B2 * | 3/2009 | Horner | B05C 17/00596 222/137 |
| 7,681,762 | B2 * | 3/2010 | Bublewitz | A61C 9/0026 222/137 |
| 7,694,853 | B2 * | 4/2010 | Keller | B65D 41/28 222/137 |
| 7,874,458 | B2 * | 1/2011 | Sogaro | B65D 81/325 222/506 |
| 7,927,312 | B2 * | 4/2011 | Sogaro | A61M 5/178 604/257 |
| 7,938,296 | B2 * | 5/2011 | Keller | B05C 17/00516 222/145.5 |
| 8,020,728 | B2 | 9/2011 | Suchan et al. | |
| 8,033,429 | B2 * | 10/2011 | Keller | B05C 17/00506 222/137 |
| 8,376,187 | B2 * | 2/2013 | Keller | B65D 81/325 222/137 |
| 8,596,499 | B2 | 12/2013 | Vogt et al. | |
| 8,608,030 | B2 | 12/2013 | Vogt et al. | |
| 8,646,662 | B2 * | 2/2014 | Habibi-Naini | B05C 17/00503 222/459 |
| 8,672,188 | B2 * | 3/2014 | Rotz | B05C 17/00556 141/346 |
| 8,746,508 | B2 * | 6/2014 | Staub | B65D 81/325 222/137 |
| 8,746,509 | B2 * | 6/2014 | An | B05C 17/00509 222/153.04 |
| 8,978,930 | B2 * | 3/2015 | Bublewitz | B05C 17/01 222/137 |
| 9,010,578 | B2 * | 4/2015 | Keller | B05C 17/00553 222/137 |
| 9,016,522 | B2 * | 4/2015 | Hayman | B01F 25/43141 222/137 |
| 9,045,259 | B2 * | 6/2015 | Greter | A61B 17/00491 |
| 9,138,772 | B2 * | 9/2015 | Pappalardo | B05C 17/00506 |
| 9,168,108 | B2 * | 10/2015 | Bublewitz | B05C 17/00593 |
| 9,272,252 | B2 * | 3/2016 | Bublewitz | B01F 35/56 |
| 9,522,368 | B2 | 12/2016 | Bublewitz et al. | |
| 9,662,676 | B2 * | 5/2017 | Kayser | B05C 17/00513 |
| 9,700,859 | B2 * | 7/2017 | Bublewitz | F17D 1/00 |
| 9,782,737 | B2 * | 10/2017 | Bublewitz | B01F 25/4314 |
| 9,981,233 | B2 | 5/2018 | Ho et al. | |
| 10,300,506 | B2 * | 5/2019 | Hiemer | B05C 17/00556 |
| 11,168,821 | B2 * | 11/2021 | Pappalardo | F16L 37/101 |
| 12,060,213 | B2 * | 8/2024 | Grünenfelder | B05C 17/01 |
| 12,083,328 | B2 * | 9/2024 | Voegel | B29C 45/26 |
| 2002/0170926 | A1 | 11/2002 | Horner et al. | |
| 2003/0050597 | A1 * | 3/2003 | Dodge | B05C 17/00586 604/82 |
| 2006/0283885 | A1 | 12/2006 | Dolman et al. | |
| 2007/0090079 | A1 * | 4/2007 | Kelller | B65D 41/28 215/296 |
| 2008/0029542 | A1 * | 2/2008 | Keller | B05C 17/00516 222/137 |
| 2009/0308891 | A1 | 12/2009 | Bublewitz et al. | |
| 2010/0102088 | A1 * | 4/2010 | Keller | B65D 81/325 222/137 |
| 2010/0163579 | A1 | 7/2010 | Keller | |
| 2011/0045430 | A1 | 2/2011 | Kim | |
| 2011/0114668 | A1 * | 5/2011 | Bublewitz | B05C 17/00593 222/137 |
| 2011/0151402 | A1 * | 6/2011 | An | A61C 9/0026 433/82 |
| 2011/0198370 | A1 * | 8/2011 | Ho | B05C 17/00513 222/137 |
| 2011/0273956 | A1 * | 11/2011 | Habibi-Naini | B05C 17/00556 366/190 |
| 2012/0267394 | A1 | 10/2012 | Pierson et al. | |
| 2013/0181008 | A1 | 7/2013 | Vogt et al. | |
| 2013/0265846 | A1 | 10/2013 | Bublewitz et al. | |
| 2014/0110435 | A1 * | 4/2014 | Pappalardo | B01F 25/43141 222/145.5 |
| 2014/0124536 | A1 | 5/2014 | Pappalardo | |
| 2015/0129615 | A1 | 5/2015 | Bates et al. | |
| 2017/0144187 | A1 | 5/2017 | Springhorn | |
| 2017/0297049 | A1 | 10/2017 | Buck et al. | |
| 2024/0359034 | A1 * | 10/2024 | Baviskar | A61J 1/201 |
| 2025/0242319 | A1 * | 7/2025 | Schock | B05C 17/00506 |
| 2025/0312816 | A1 * | 10/2025 | Schoeck | B05C 17/00553 |

FOREIGN PATENT DOCUMENTS

| | | | |
|---|---|---|---|
| EP | 2219768 | A2 | 8/2010 |
| WO | 2012066073 | A1 | 5/2012 |
| WO | 2016046099 | A1 | 3/2016 |

* cited by examiner

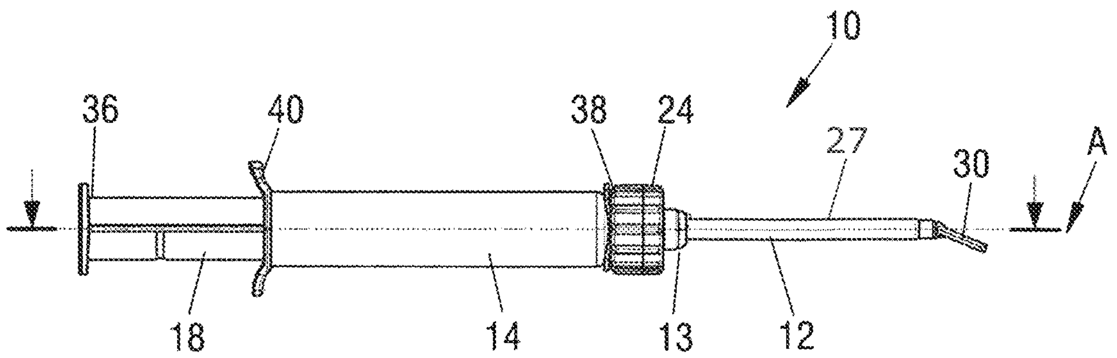
Fig.3
Fig.4
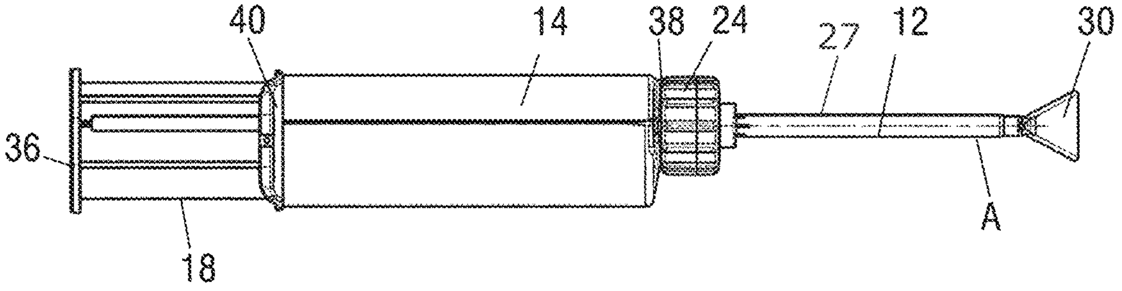

SECTION D-D

SECTION F-F

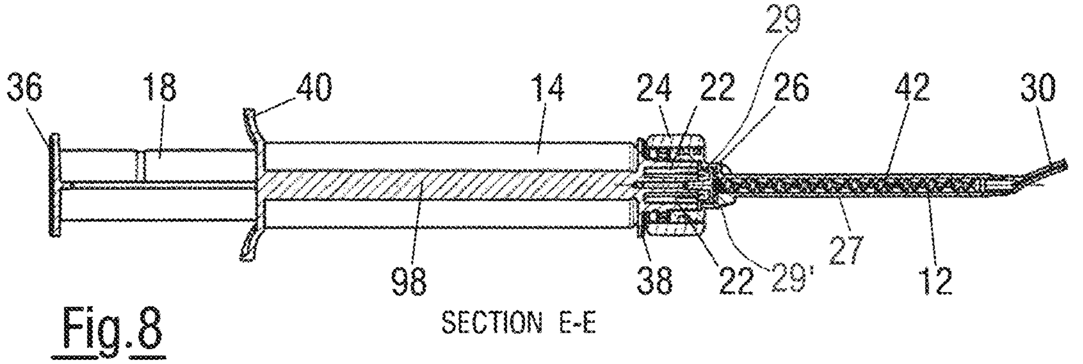
Fig.8
Fig.9
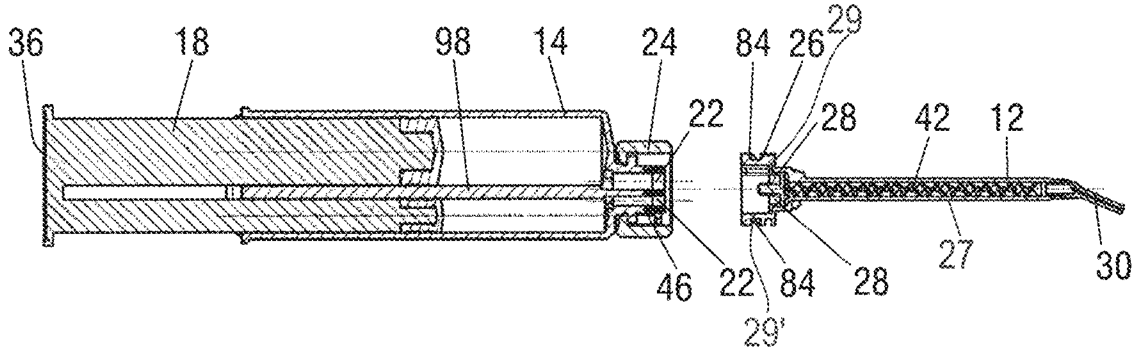

SECTION D-D

FIG. 14A
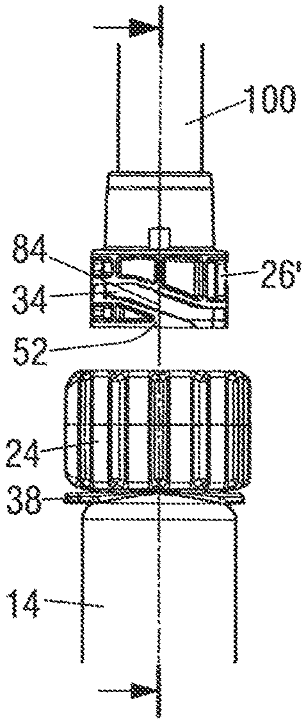
FIG. 14B
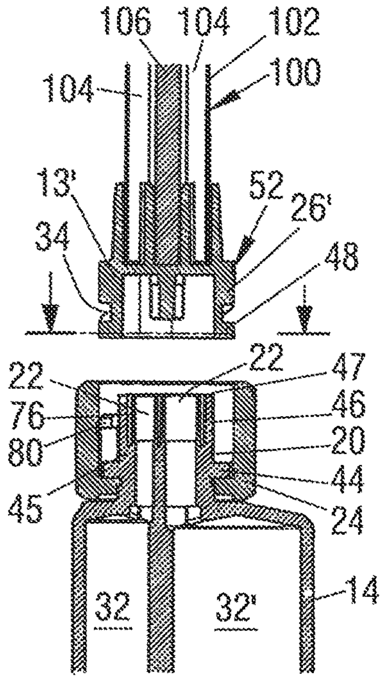
FIG. 14C
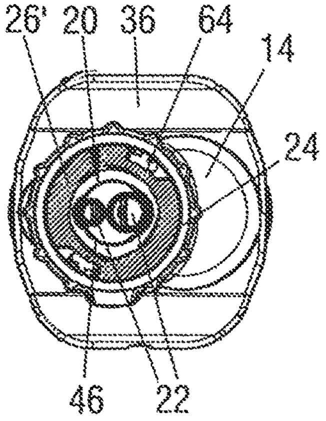
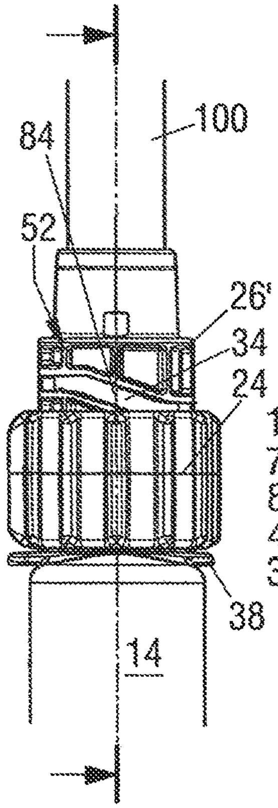
FIG. 14D
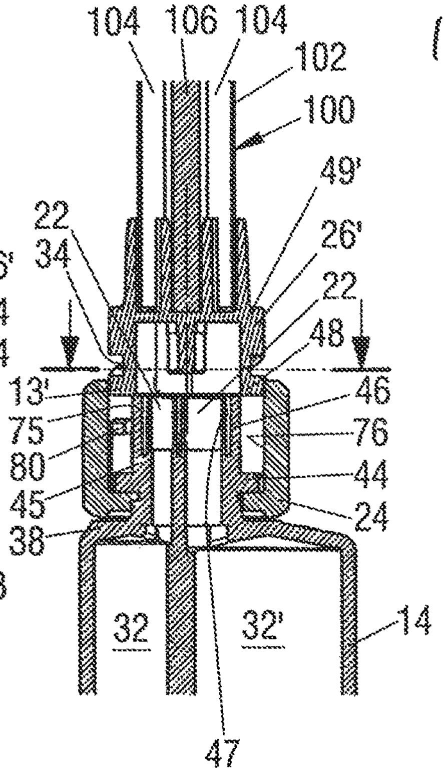
FIG. 14E
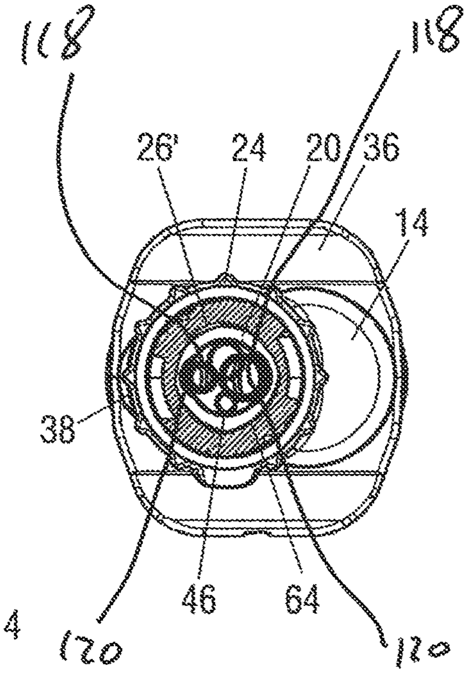
FIG. 14F FIG. 14G
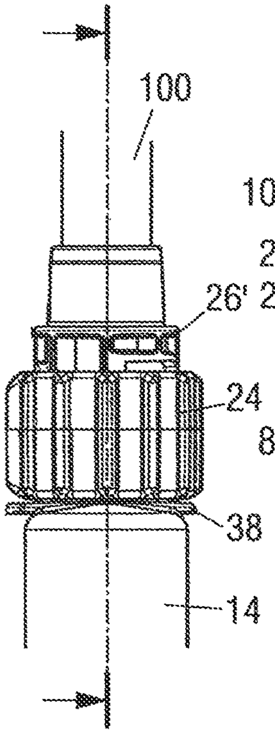
FIG. 14H
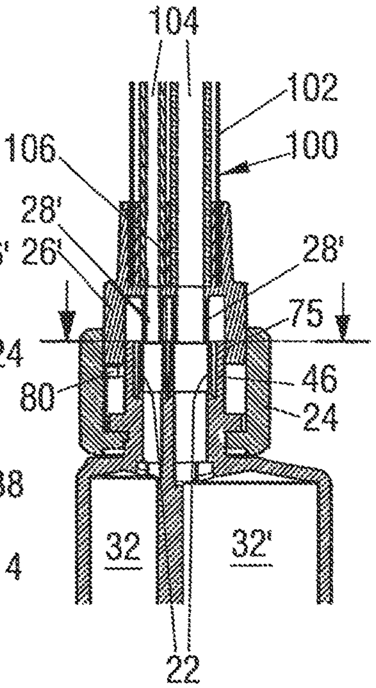
FIG. 14I
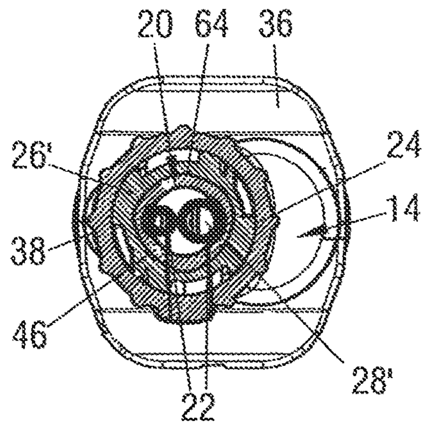
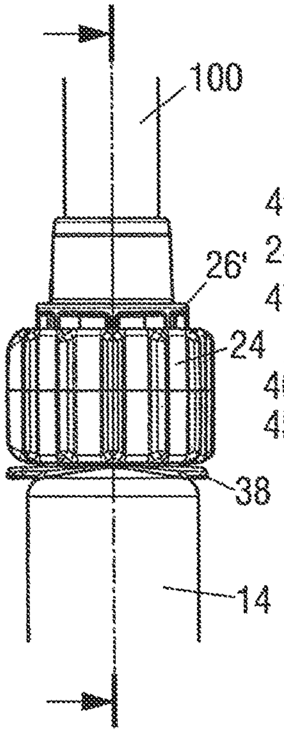
FIG. 14J
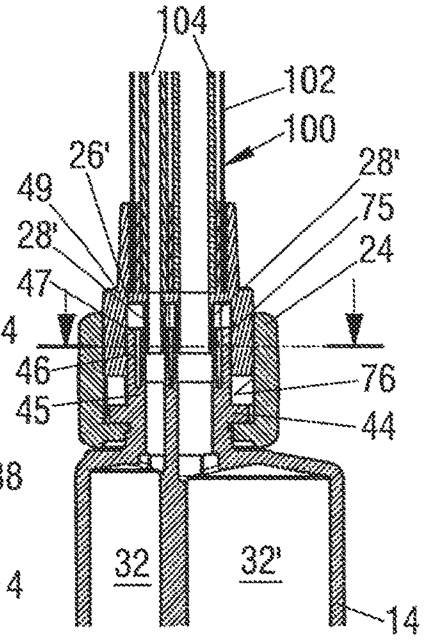
FIG. 14K
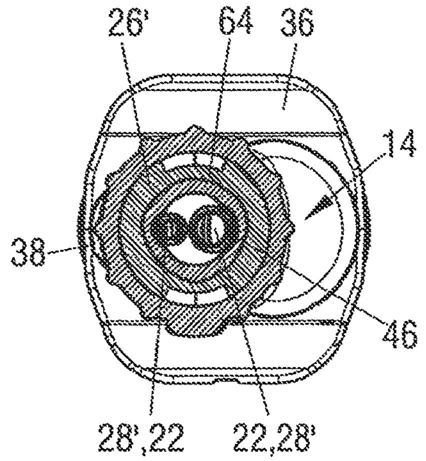
FIG. 14L FIG. 16A
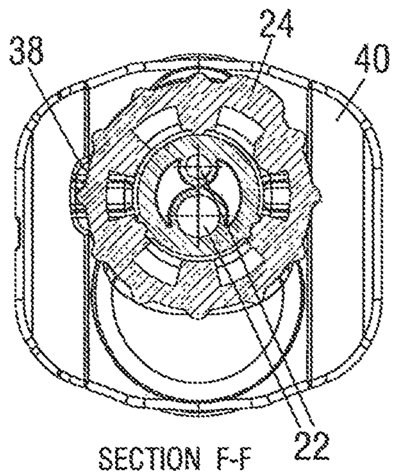
SECTION F-F
FIG. 16B
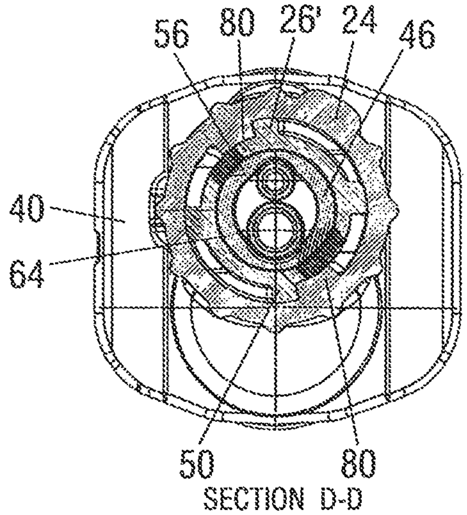
SECTION D-D
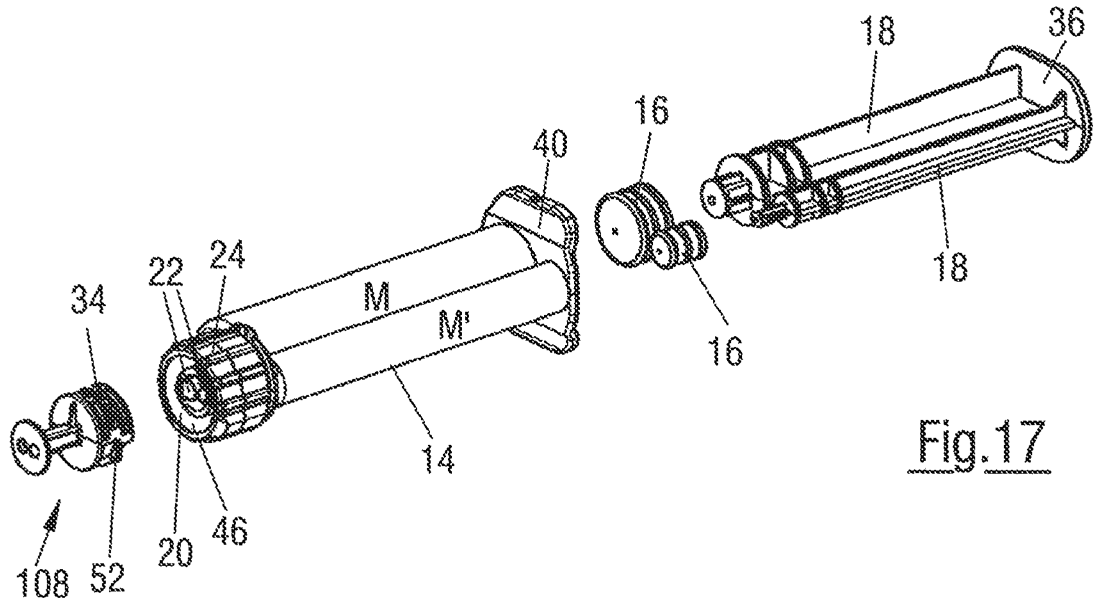
Fig.17

FIG. 18A
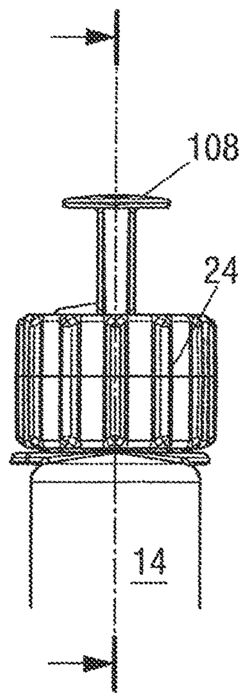
FIG. 18B
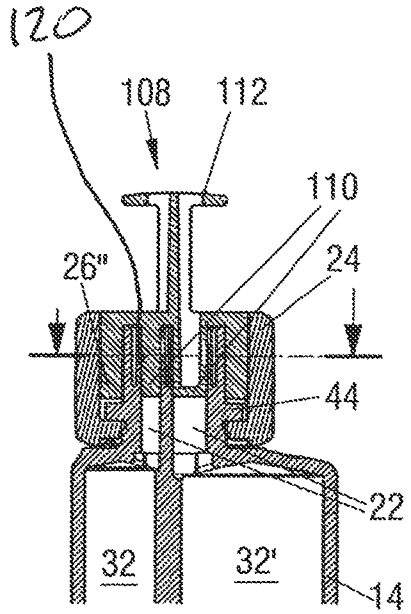
FIG. 18C
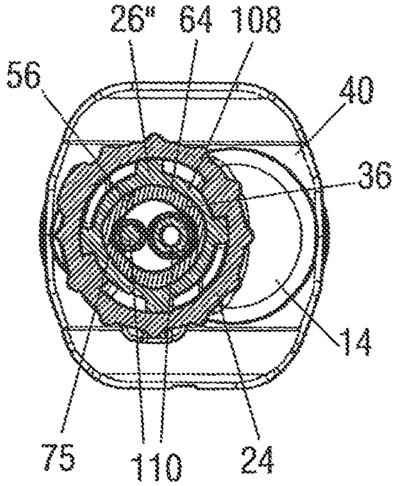
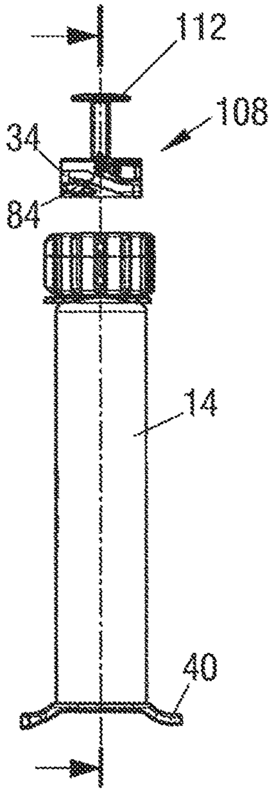
FIG. 19A
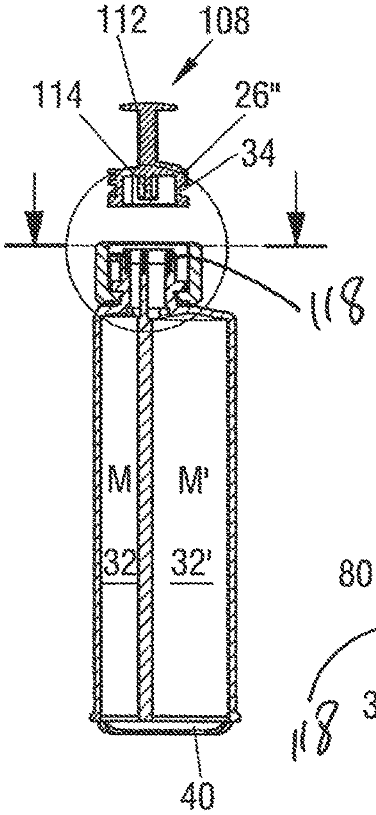
FIG. 19B
FIG. 19C
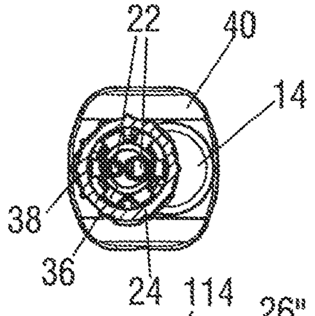
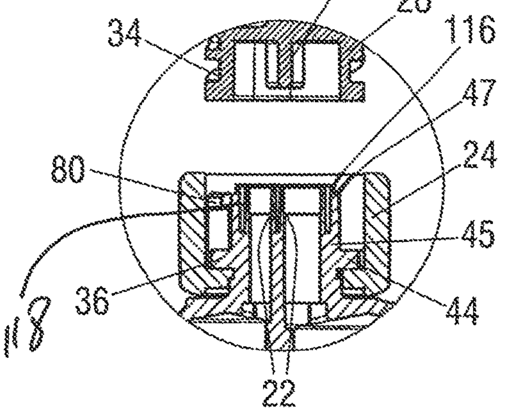
FIG. 19D

DISCHARGE ARRANGEMENT, COMPONENT, ACCESSORY, METHOD OF CONNECTING AN ACCESSORY TO A COMPONENT, AND SYSTEM

CROSS-REFERENCE TO RELATED APPLICATIONS

This application is a U.S. National Stage application of International Application No. PCT/EP2020/071276, filed Jul. 28, 2020, which claims priority to European Patent Application No. 19188746.2, filed Jul. 29, 2019, the contents of which are hereby incorporated herein by reference.

BACKGROUND

Field of the Invention

The present disclosure relates to a discharge arrangement for multi-component material, the discharge arrangement can include a fluid conducting component haying an outlet part, an accessory haying an inlet part, and a locking ring, the inlet part of the accessory being releasably attachable to the outlet part of the fluid conducting component, wherein the outlet part comprises two or more outlets surrounded by a collar, with an outer surface of the collar comprising a first rotation constraining member, wherein the inlet part comprises two inlets surrounded by a sleeve, the two inlets being configured complementary to the two outlets of the fluid conducting component for a coupling of the outlets to the inlets to enable a fluid communication between a respective one of the outlets with a respective one of the inlets. The disclosure further relates to a fluid conducting component, an accessory, to a method of connecting an accessory to an outlet part of a discharge arrangement and to a system comprising a cartridge, an extension, and a mixer.

Background Information

Conventional static mixers and dynamic mixers, respectively mixing tips as they are also known as, are used to mix multi-component material dispensed from a multi-component cartridge. Such mixing tips are used in a plethora of fields of application ranging from industrial applications, such as the use of adhesives to bond structural components one to another, or as protective coatings for buildings or vehicles, to medical and dental applications, for example, to make dental molds.

The multi-component material is, for example, a two-component adhesive comprising a filler material and a hardener. In order to obtain the best possible mixing result, e.g. an adhesive having the desired bond strength, the multi-component material has to be thoroughly mixed. Fax this purpose the mixing tips comprise several structures and/or mixing segments arranged one after the other that repeatedly divide and re-combine part flows of the multi-component material to thoroughly mix the multi-component material.

In order to connect the mixing tips to the cartridge a connection interface is used with an inlet part of the static mixer being formed complementary to the outlet part of the cartridge and with a locking ring present at the static mixer in order to ensure a reliable attachment of the mixing tip at the cartridge that avoids the mixing tip becoming detached from the cartridge during the dispensing process.

SUMMARY

Depending on the field of application the multi-component material can be comparatively expensive and may only be used for one application at a time, with a multi-component cartridge storing materials for 5 or more, preferably 10 or more such applications. This is particularly true, for example in the dental field or medical field, where only part of the multi-component material stored in the cartridge is used for one application/patient at a time with the remaining multi-component material being stored in the multi-component cartridge for future applications. For this reason the connection interface is typically formed such that a cross-contamination cannot occur, otherwise the material remaining in the cartridge can become unusable which is costly.

Moreover, the fact that the locking ring is generally present at the mixing tip and is thus, a disposable part means that the demand in effort and cost on producing the mixing tips is too high and also means that the carbon footprint of such mixing tips is higher than need be.

Moreover, the positioning of the mixing tip at the cartridge can be arduous at times and requires the correct positioning and alignment by hand of the operator of such discharge assemblies. This can be particularly tedious when medical professionals are wearing gloves and hence cannot grip the components in an as ideal as possible manner.

For these reasons it is an object of the present disclosure to provide a connection interface between a mixing tip and a cartridge which is less demanding in effort and cost, which reduces the amount of carbon footprint associated with the manufacture of the mixing tips, which improves the inherent capability of alignment of the mixing tip relative to the cartridge, which is more simple to handle than the prior art interface connectors, and which avoids cross-contamination at the outlets from the cartridge.

This object is satisfied by a discharge arrangement having the features disclosed herein.

Such a discharge arrangement for multi-component material comprises a fluid conducting component having an outlet part, an accessory having an inlet part, and a locking ring, the inlet part of the accessory being releasably attachable to the outlet part of the fluid conducting component, wherein the outlet part comprises two or more outlets surrounded by a collar, with an outer surface of the collar comprising a first rotation constraining member, wherein the inlet part comprises two inlets surrounded by a sleeve, the two inlets being configured complementary to the two outlets of the fluid conducting component for a coupling of the outlets to the inlets to enable a fluid communication between a respective one of the outlets with a respective one of the inlets, with an inner surface of the sleeve comprising a second rotation constraining member, wherein the first and second rotation constraining members are formed complementary to one another to inhibit a rotation of the inlet part relative to the outlet part; and wherein the locking ring is fixedly arranged at the outlet part and is configured to releasably lock the fluid conducting component to the accessory by engaging an outer surface of the inlet part of the accessory.

By forming first and second rotation constraining members complementary to one another an alignment of the components is improved. Moreover, such an interface is simpler to handle.

By forming the locking ring at the cartridge rather than at the mixing tip, a mixing tip can be firmed which is less demanding in effort and cost, and which reduces the amount of carbon footprint associated with the manufacture of the mixing tips.

On assembling such a discharge arrangement the different components enable a simpler handling of the mixing tip and the cartridge in comparison to prior art interface connectors The first rotation constraining member can be formed by a non-uniform shaped outer surface of the collar. A non-uniform outer shape of the collar means that no continuous movement relative to the surface is possible which inhibits the movement of structures relative thereto, this provides a more sturdy re-usable interface connector.

The second rotation constraining member can be formed by a non-uniform shaped inner surface of the sleeve. A non-uniform inner shape of the sleeve means that no continuous movement relative to the surface is possible which inhibits the movement of structures relative thereto, this likewise provides a sturdier re-usable interface connector.

The inner surface of the sleeve can be formed complementary to the outer surface of the collar. In this way an alignment of the components relative to one another can be improved. Moreover, such an interface is simpler to handle.

The outer surface of the collar can comprise one or more projections, one or more recesses, an undulating surface, a cylindrical outer shape, a non-cylindrical outer shape, an oval outer shape, a rectangular outer shape, a square outer shape a polygonal outer shape and combinations of the foregoing forming the first rotation constraining member. Similarly, the inner surface of the sleeve comprises one or more projections, one or more recesses, an undulating surface, a non-cylindrical outer shape, an oval outer shape, a rectangular outer shape, and combinations of the foregoing forming the second rotation constraining member. Such shapes of the outer and/or inner surface of the respective element help in avoiding the relative movement between two components thereby inhibiting a rotation of one of the components relative to the other. Such structures can beneficially be used as rotation constraining members and thereby aid in ensuring a correct alignment of the two parts relative to one another which avoids cross-contamination and also ensures that the components of the interface are not destroyed in any form.

An inner surface of the locking ring can face the outer surface of the collar, with the inner surface comprising one or more members of an inner thread, one or more members of a plug and release type connector, one or more members of a bayonet type of connector and/or one or more noses.

Similarly the outer surface of the inlet part of the accessory can face the inner surface of the locking ring, with the outer surface of the inlet part comprising one or more members of an outer thread, one or more members of a plug and release type connector, one or more members of a bayonet type of connector, one or more noses and/or one or more grooves. Such a connection device can usefully be employed to latch the inlet part to the outlet part via the locking ring.

Moreover, a connection, such as a threaded connection enables the axial and radial fixation of the inlet part relative to the locking ring and hence permits an improved handling of the discharge arrangement.

The collar can comprise a ridge extending from a front end of the collar in the direction of the outlets and the ridge is in particular a cylindrical ridge, with a rear end of the collar being attached to the fluid conducting component. The ridge is beneficial for permitting an improved alignment of the inlet part relative to the outlet part while preventing the inlets coming into contact with the outlets. This is because if the first rotation constraining members are not aligned with the second rotation constraining members an axial movement of the inlet part towards the cartridge is prevented by the collar, the ridge, particularly if it is a cylindrical ridge nevertheless pre-positions the inlet part relative to the outlet part and allows the inlet part to be rotated relative to the outlet part while trying to find the correct axial alignment of the first rotation constraining members relative to the second rotation constraining members.

The locking ring can have a first end projecting in the direction of the outlets away from the fluid conducting component, with the two or more outlets being arranged closer towards the fluid conducting component than the first end of the locking ring. By firming the outlets recessed back with respect to the locking ring also aids in avoiding a possible cross-contamination.

The sleeve can comprise a front end and a rear end, with the front end being arranged furthest away from an outlet of the accessory, with the inlets being arranged closer towards the outlet than the front end. The arrangement of the inlets in this way ensures that the likelihood of cross-contamination between e.g. mixing tip and the cartridge can be significantly reduced.

The two inlets of the respective inlet part can comprise a sealing surface configured to seal with respect to an inner surface of the respective outlet of the fluid conducting component for a coupling of the outlets to the inlets. The presence of such a sealing region between the inlets and outlets of the accessory and the fluid conducting component, avoids multi-component material from exiting the outlets into regions other than into the inlets.

The respective sealing surface can be configured to seal with respect to the respective inner surface over a length selected in the range of 5% to 60%, in particular in the range of 10% to 40%, especially in the range of 15 to 30%, of the respective outlet. The size of the sealing region is selected in dependence on the size of the accessory and how filigree this is. For example, for static mixers having a length in the range of 2 to 5 cm, the sealing region is selected smaller than for an extension. This is because the size of the sealing region also defines the pressure acting between the respective components and the larger the sealing region is in a relative sense, the larger the pressure required to separate the respective components is. If too large a sealing region is selected the pressure acting between the respective components can be so large as to damage the respective inlets or outlets of the component inoperable.

The accessory, in particular if the accessory is a static mixer, can comprise a housing which connects to the inlet pail, wherein at least one of the housing and the inlet part comprises one or more anti-rotation members to inhibit a rotation between the housing and the inlet part. The provision of such anti-rotation members between the housing of e.g. a static mixer and its inlet part, prevents a rotation of the housing relative to the inlet part during normal operation of the static mixer.

Both the housing and the inlet part can comprise anti-rotation members, with the one or more anti-rotation members of the housing being formed complementary to the one or more anti-rotation members of the inlet part. Forming the respective anti-rotation members complementary to one another improves the inhibition of a relative movement of housing relative to the inlet part.

For example, a first type of anti-rotation member present at one of the housing and the inlet part can be formed by notches, recesses and the like, whereas a second type of the anti-rotation members present at the other one of the housing and the inlet part can be formed by a projection, a cam, a web of material and the like which is formed complementary in shape to the first type of anti-rotation members.

The anti-rotation members of the housing are formed at an end of the housing adjacent to the inlets of the inlet part. In this way the anti-rotation members are formed at that part of the housing where the chance of undesired rotation may be largest, as the user of such an accessory will typically hold and turn the accessory at this part on connecting the accessory to the fluid conducting component.

It is favorable if between two and twelve such anti-rotation members are provided, i.e. two at each inner surface of the housing and two on an outer surface of the inlet part mating with the inner surface of the housing.

According to a further object the present disclosure relates to a fluid conducting component, in particular for a discharge arrangement, wherein the fluid conducting component is one of a cartridge optionally filed with multi-component materials and an extension, the fluid conducting component having an outlet part, the outlet part comprising two or more outlets from the fluid conducting component, the two or more outlets being surrounded by a collar, with an outer surface of the collar comprising a first rotation constraining member, the fluid conducting component further comprising a locking ring attached at the outlet part, with an inner surface of the locking ring facing the outer surface of the collar.

The multi-component cartridge can thus be filled with materials selected from the group of members consisting of topical medications, medical fluids, wound care fluids, cosmetic and/or skin care preparations, dental fluids, veterinary fluids, adhesive fluids, disinfectant fluids, protective fluids, paints and combinations of the foregoing. The materials are generally towable materials, such as liquids, fluids and powdery substances in combination with a liquid, such as water. The limit of the material stored in the cartridge is the specific viscosity and the particle size.

Such fluids and hence the dispensing assembly can therefore be expediently used in the treatment of target areas such as the nose (e.g. anti-histaminic creams etc.), ears, teeth (e.g. molds for implants or buccal applications (e.g. aphtas, gum treatment, mouth sores etc.), eyes (e.g. the precise deposition of drugs on eyelids (e.g. chalazion, infection, anti-inflammatory, antibiotics etc.), lips (e.g. herpes), mouth, skin (e.g. anti-fungal, dark spot, acne, warts, psoriasis, skin cancer treatment, tattoo removal drugs, wound healing, scar treatment, stain removal, anti-itch applications etc.), other dermatological applications (e.g. skin nails (for example anti-fungal applications, or strengthening formulas etc.) or cytological applications.

Alternatively the fluids and hence the dispensing assembly can also be used in an industrial sector both for the production of products as well as for the repair and maintenance of existing products, e.g. in the building industry, the automotive industry, the aerospace industry, in the energy sector, e.g. for wind-turbines, etc. The dispensing assembly can, for example, be used for the dispensing of construction material, sealants, bonding material, adhesives, paints, coatings and/or protective coatings.

According to a further aspect the present disclosure relates to an accessory, in particular for a discharge arrangement in accordance with the present teaching, wherein the accessory is one of an extension, a cap and a mixer, the accessory comprising an inlet part.

The accessory can thus be an extension which comprises an outer tube, preferably of metal, and two or more separate passages formed within the outer tube, with each passage being connected to a respective one of the inlets, wherein a first end of the extension comprises the inlet part and the second end of the extension comprises an outlet part. Such an extension can be used if the position of application is e.g. in a cavity and the dispensing outlet of a mixer connected to the cartridge would not be able to access the region of interest within the cavity.

The two or more separate passages of the extension that are formed within the outer tube can be guided separately between a respective one of the inlets and a respective one of the outlets. Thereby one can ensure that the two materials are separated from one another along the extent of the extension between the inlets and the outlets. In this way one can avoid a pre-hardening of the extruded materials in the extension. If the extruded materials were to pre-harden within the extension, one would have to change not only the mixer but also the extension if a user intermittently pauses the dispensing process on using the extension.

The accessory can be the cap that comprises the inlet part, with the two or more inlets of the cap being formed as two or more plugs.

Alternatively the accessory can be the mixer that comprises the inlet part, with the two or more inlets being connected to a mixing chamber having a mixing element arranged therein for combining flows of materials entering into the mixer via the two or more inlets.

In this connection it should be noted that at least one of the cartridge, the cap, the extension and the mixer can be formed of plastic in an injection molding process. Such plastics typically comprise polyethylene (PE), polyethylene terephthalate (PET), poly amide (PA), polypropylene (PP) and polybutylene terephthalate (PBT).

The accessory can be one of a static mixer and a dynamic mixer having an optional spreader dispensing head installed at a dispensing outlet thereof. Alternatively the fluid conducting component can be an intervening extension piece for providing an extension between the cartridge and a static mixer having an optional spreader dispensing head.

According to a farther aspect the present disclosure relates to a method of connecting an accessory to an outlet part of a discharge arrangement, the method comprising the steps of:

- aligning the inlet part of the accessory relative to the outlet part;
- inserting the inlet part into the outlet part;
- rotationally fixing the inlet part relative to the outlet part; and
- rotating the locking ring to axially shift the inlet part towards the outlet part and to latch the inlet part to the outlet part.

The advantages described in the foregoing in connection with the discharge assembly are achieved when the fluid conducting component is connected to the accessory in the manner described above.

By providing a fluid conducting interface in which the inlets and the outlets do not contact one another until the inlet part is aligned relative to the outlet part, a cross-contamination between inlets and outlets is avoided, whereby the lifetime of contents stored e.g. in the cartridge can be reliably maintained.

According to a farther aspect the present disclosure relates to a system comprising two fluid conducting components, and one or more accessories, wherein one of the fluid conducting components is a cartridge, optionally filed with multi-component materials, such as a multi-component bio-materials, especially medical adhesives, sealants, hemostats, adhesive preventions, dental adhesives and the other one of the fluid conducting components is an extension, wherein the accessory is one of a cap and a mixer.

BRIEF DESCRIPTION OF THE FIGURES

The invention will be explained in more detail hereinafter with reference to the drawings.

FIG. 3 is a side view of the discharge arrangement of FIG. 1;

FIG. 4 is a top view of the discharge arrangement of FIG. 1;

FIG. 8 a sectional view taken along the sectional line E-E of FIG. 5;

FIG. 9 is a sectional view similar to that of FIG. 5, with a mixer detached from the cartridge;

FIGS. 16A and 16B are sectional views similar to FIGS. 6 and 7 of the further connection interface of FIGS. 15A and 15B;

FIG. 17 is an exploded view of components of a cartridge and a cap;

FIGS. 18A-18C are further views of the cap of FIG. 17 connected to the cartridge; and FIGS. 19A-19D are further views of a cartridge and a cap, with yet a further design of the connection interface.

DETAILED DESCRIPTION

Figure 1:
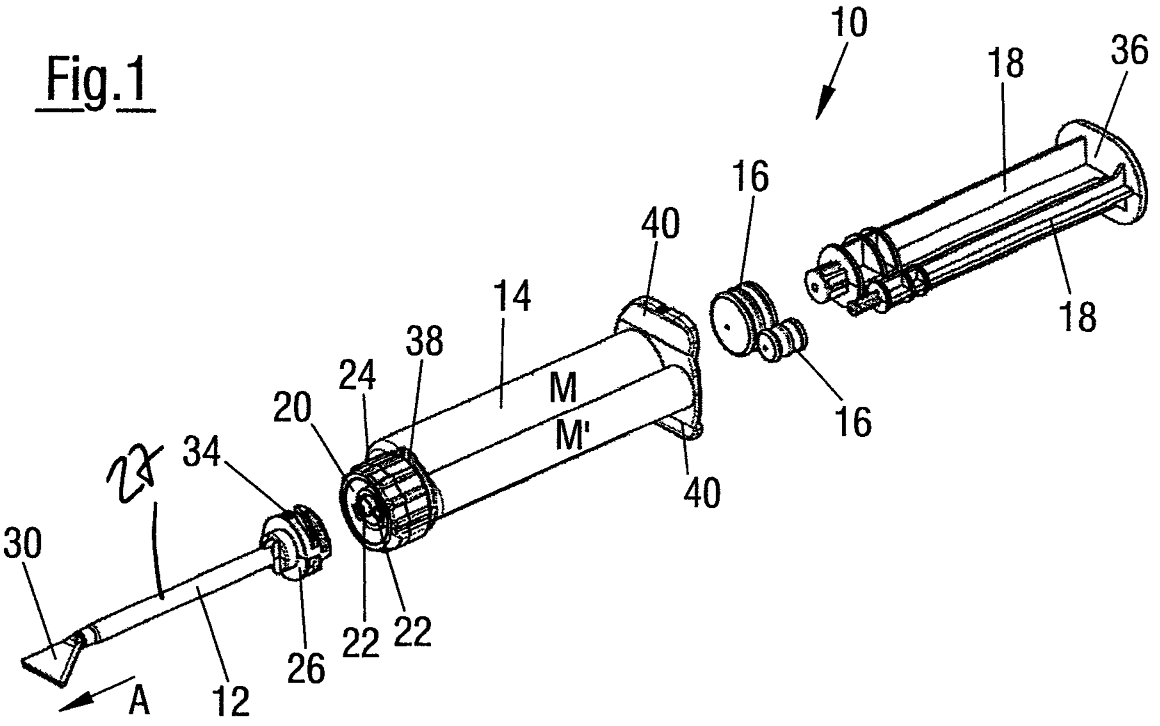
FIG. 1 is an exploded front view of components of a discharge arrangement.

In the following the same reference numerals will be used for parts having the same or equivalent function. Any statements made having regard to the direction of a component are made relative to the position shown in the drawing and can naturally vary in the actual position of application.

FIG. 1 shows an exploded front view of components of a discharge arrangement 10. The discharge arrangement 10 comprises a static mixer 12, connected to a cartridge 14. In a manner known per se pistons 16 and plungers 18 are arranged within the cartridge 14. The cartridge 14 is provided to store and supply two-component materials M, M' in a respective cartridge chamber 32, 32' (see FIG. 2). The front end of the cartridge 14 remote from the plungers 18 comprises an outlet part (outlet) 20. The outlet part 20 comprises two outlets 22 from the cartridge 14, with the outlet part 20 being surrounded by a locking ring 24.

The outlet part 20 is configured to be coupled to an inlet part (inlet) 26 of the static mixer 12. The inlet part 26 comprises two inlets 28 (see FIG. 2) into the static mixer 12. At its end remote from the inlets 28 the static mixer 12 comprises a dispensing outlet 30. Moreover, the inlet part 26 comprises an outer thread which can be engaged by the locking ring 24.

The cartridge 14 further comprises wings 40 arranged at an end disposed opposite of the outlet part 20. The wings 40 enable the cartridge 14 to be gripped while this is in use for dispensing the materials M, M' stored therein.

The cartridge 14 further comprises a plate 38 at the outlet part 20, with the outlet part 20 being arranged at said plate 38 extending in the direction of the longitudinal axis A of the discharge arrangement 10 away from the wings 40, with the longitudinal axis A extending essentially in parallel with a direction of dispensing and an elongate extent of the cartridge 14.

The plungers 18 are connected to a base 36, such that when the plungers 18 are moved into the cartridge 14 these move together due to their connection via the base 36.

Figure 2:
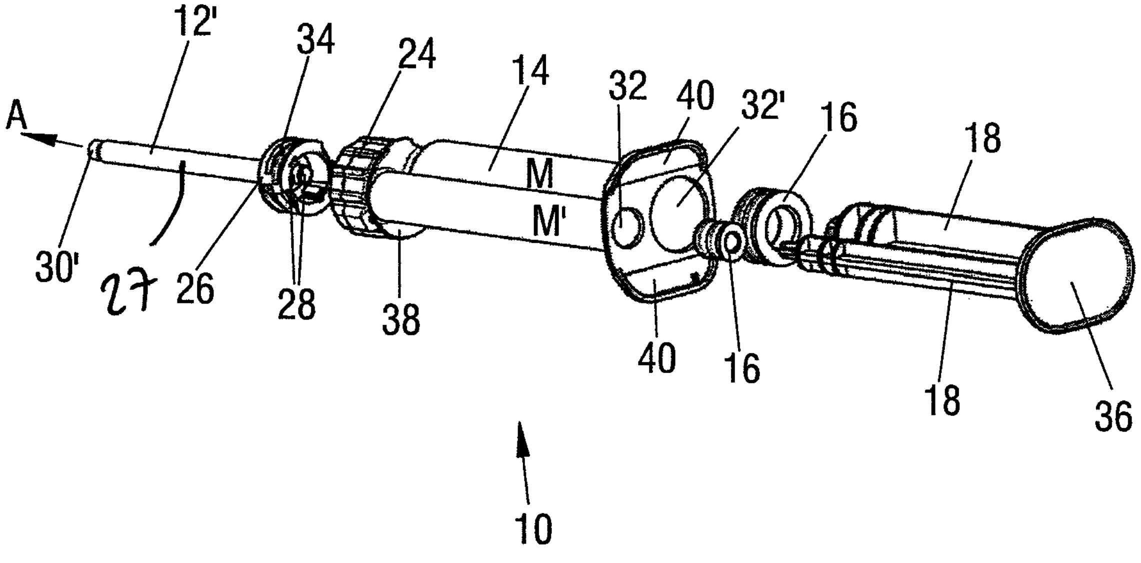
FIG. 2 is an exploded view of components of a further discharge arrangement.

FIG. 2 shows an exploded view of components of a further discharge arrangement 10. The difference to the discharge arrangement 10 of FIG. 1 is the type of dispensing outlet 30' at the static mixer 12'.

The static mixer 12 of FIG. 1 comprises a spreader dispensing head as its dispensing outlet 30, whereas the dispensing outlet 30' shown in FIG. 2 comprises a circular outlet opening at the dispensing outlet 30'. In this connection it should be noted that any form of dispensing outlet 30, 30' can be present at the mixer 12, 12'. For example, the dispensing outlet 30, 30' of the static mixer 12, 12' can comprise a Luer conus that can be connected to a Luer lock spreader or to another component via the Luer lock.

It should further be noted that the present embodiments are described in terms of a static mixer; however, the features of the inlet part 26 could also be present at a dynamic mixer and would function in the same way at such a dynamic mixer.

FIG. 3 shows a side view of the discharge arrangement 10 of FIG. 1, whereas FIG. 4 shows a top view of the discharger arrangement 10 of FIG. 1.

The cartridge 14 shown comprises cartridge chambers 32, 32' having different filling volumes and in particular shows a so-called 4:1 cartridge 14 in which the volume of the larger cartridge chamber 32' has four times the volume of the smaller cartridge chamber 32. In this connection it should be noted that the cartridge 14 can be a 1:1, 2:1, 4:1, 6:1, 8:1, 10:1 cartridge 14 etc.

Figure 5:
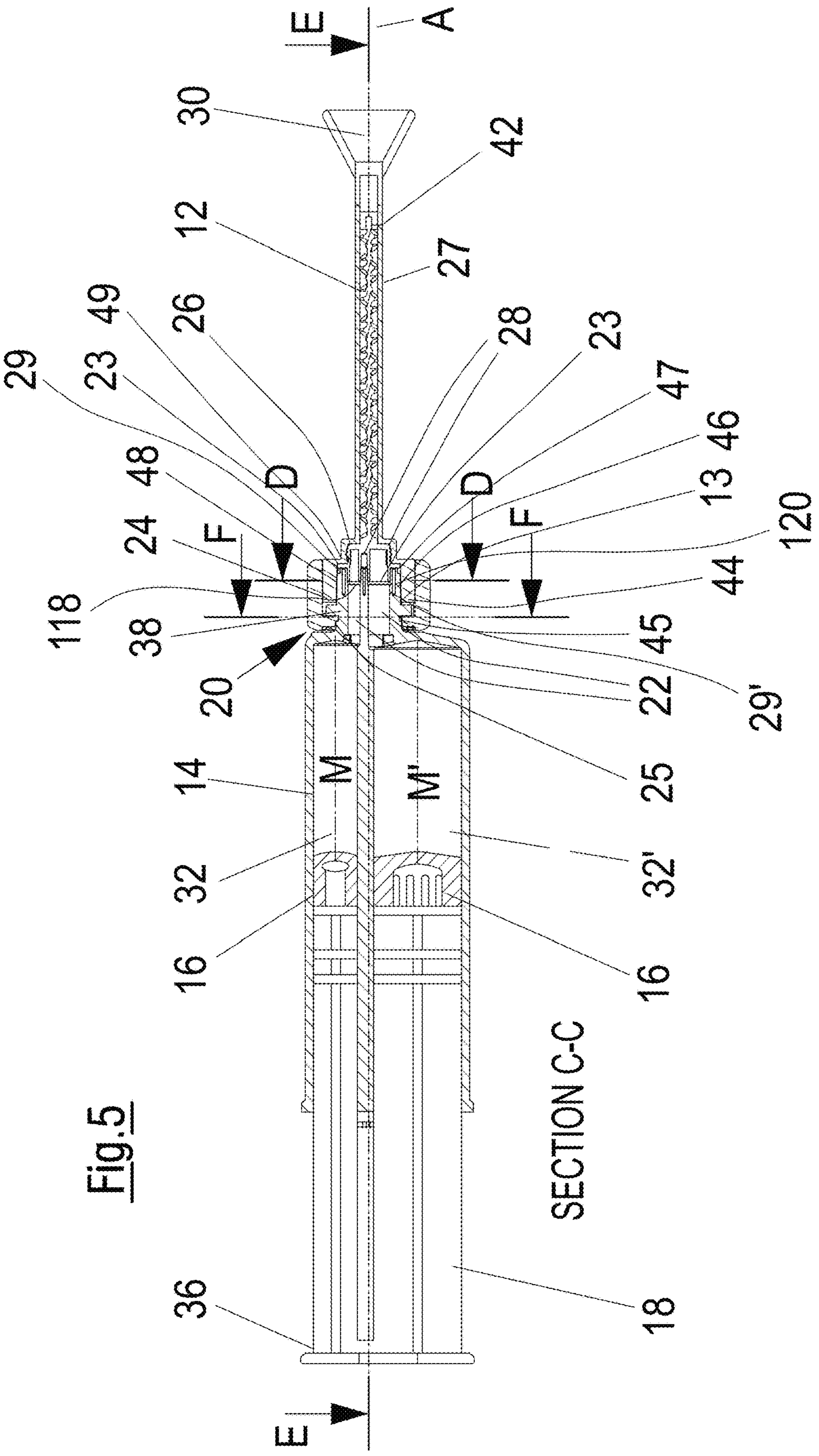
FIG. 5 is a sectional view taken along the sectional line C-C of FIG. 3.

71 FIG. 5 shows a sectional view of the sectional line C-C of FIG. 3. One can see how the pistons 16 and the plungers 18 are arranged within the cartridge chambers 32, 32'.

Moreover, a mixing element 42 of the static mixer 12 can be seen. In this connection it should be noted that the mixing element 42 can be composed of a plurality of mixing element segments not shown), with the plurality of mixing element segments being of like design or also of varying design. The mixing element segments can for example, be so-called helical mixing element segments, T-mixer mixing element segments, wave mixing element segments, mixing element segments of a 3 way, 4 way mixer or also other various mixing element segments known to the person skilled in the art.

The arrangement of the outlet part 20 at the plate 38 can also be seen, with the two outlets 22 projecting in the direction of the longitudinal axis A away from the plate 38 from the cartridge chambers 32, 32'. A support plate 44 is arranged between the plate 38 and an outlet opening 23 of the outlets 22. The locking ring 24 is arranged such that an inwardly projection lip 25 thereof present at a rear end 45 of a collar 46 is arranged between the plate 38 and the support plate 44. The outlets 22, 22' are configured as freestanding relative to the support plate 44 and the collar 46.

A rear end 13 of the static mixer 12 which comprises the inlet part 26 comes to rest on the support plate 44 when the inlet part 26 is connected to the outlet part 20 and is thereby received within the locking ring 24.

The outlets 22 are surrounded by the collar 46, with a sleeve 48 of the inlet part 26 being arranged within a space formed between the support plate 44, the locking ring 24 and the collar 46 in the locked position of the discharge arrangement 10. The sleeve 48 surrounds the inlets 28 arranged at the inlet part 26 of the static mixer 12.

As indicated in FIGS. 1 to 5 etc. the mixer 12, 12' comprises a housing 27 of which one end partially covers and connects to the inlet part 26 and the other end disposed opposite the end connecting to the inlet part 26 comprises the respective dispensing outlet 30, 30'.

At least one of an inner surface of the housing 27 and an outer surface 52 of the inlet part 26 can comprises one or more anti-rotation members 29, 29' at an end of the housing 27 adjacent to the inlets 28 of the inlet part 26 to inhibit a rotation between the housing 27 and the inlet part 26, 26', 26" at that end of the housing remote from the dispending outlet 30, 30'.

In the present example both the inner surface of the housing 27 and the outer surface 52 of the inlet part 26 comprise anti-rotation members 29, 29', with the one or more anti-rotation member 29 of the housing 27 being formed complementary to the one or more anti-rotation members 29' of the inlet part 26. Preferably between two and eighteen anti-rotation members 29, 29' are provided in total, and in particular between two and six anti-rotation members 29 are provided at the inner surface of the housing 27 and between two and six anti-rotation members 29' are provided at the outer surface 52 of the inlet part 26.

In this connection it should be noted that the outer surface 52 of the inlet part 26 is the surface of the inlet part which extends transverse to the surface of the inlet part 26 comprising the mixing element 42, i.e. the outer surface 52 does not comprise the mixing element 42 of the mixer 12, 12'.

Figure 6:
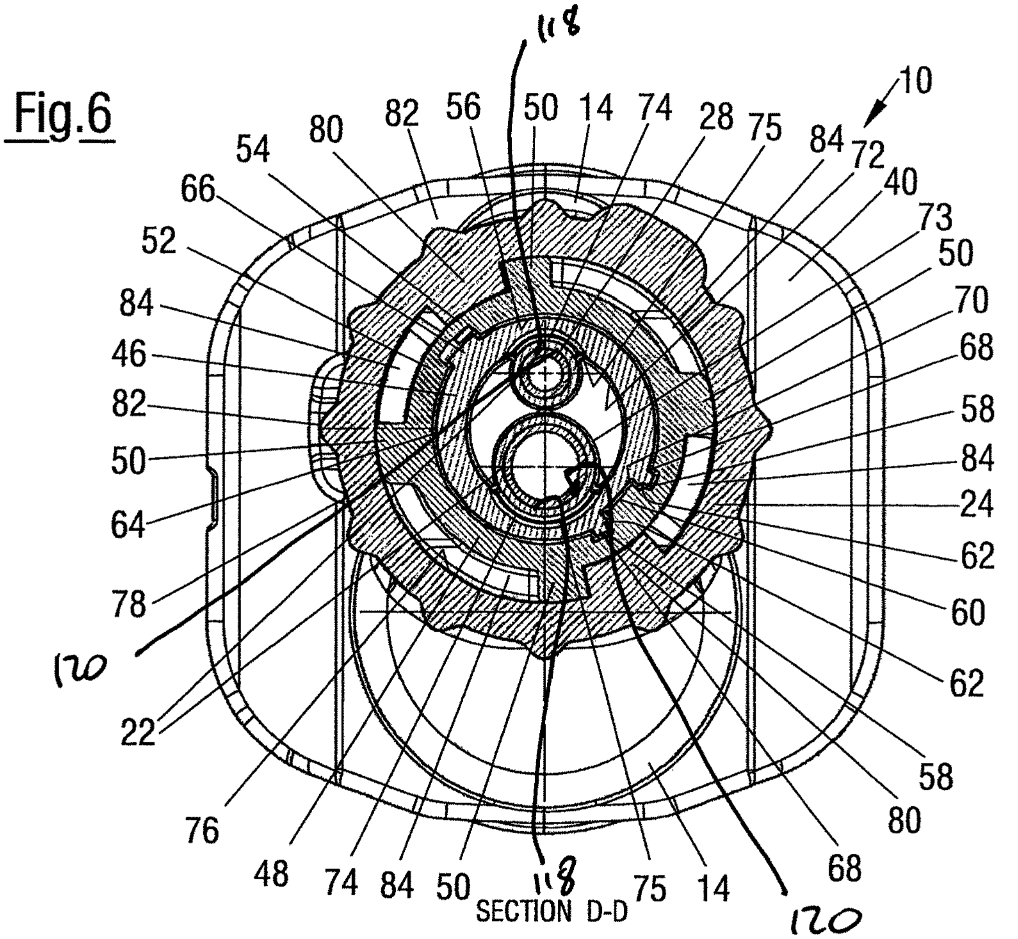
FIG. 6 is a part sectional view taken along the sectional line D-D of FIG. 5.

FIG. 6 shows a part sectional view taken at the sectional line D-D of FIG. 5. In this sectional view the inlets 28 of the inlet part 26 are inserted into the outlets 22 of the outlet part 20.

The collar 46 surrounds the outlets 22, with a bridge 74 bridging a gap 75 between a part of the outlets 22 and a part of the collar 46. The collar 46 has an inner surface 72 facing an outer surface 73 of the outlets 22.

An inner surface 56 of the sleeve 48 is formed complementary to the outer surface 64 of the collar 46, such that once the inlet part 26 is inserted into the outlet part 20, first rotation constraining members in the form of first projections 66, second projections 68 and first grooves 70 present at the outer surface 64 of the collar 46 engage with second rotation constraining members in the form of a first recess 54, second recesses 58 and a web 60 formed at the inner surface 56 of the sleeve 48 complementary to the first rotation constraining members.

Moreover, a step 62 is present between the web 60 and the second recesses 58 and forms a part of the second rotation constraining members.

The locking ring 24 is provided in order to lock the outlet part 20 to the inlet part. This is achieved by noses 80 present at an inner surface 76 of the locking ring 24 which act as part of an inner thread engaging the thread 34 present at the inlet part 26.

The thread 34 is formed as an outer thread 84' that comprises a channel 84. The channel 84 is inclined with respect to the longitudinal axis A such that on rotation of the locking ring 24, the nose 80 moves along the channel 84, so that the locking ring 24 moves radially and axially relative to the inlet part 26 which is moved axially further towards the outlet part 20.

In order to be able to grip the locking ring 24, an outer surface 78 of the locking 24 comprises a non-uniform outer shape comprising bulges 82.

It should be noted that a height of the outlet openings 23 of the outlets 22 relative to the support plate 44 can be between 20 and 85% of a height of the locking ring 24 relative to the support plate 44.

Similarly a height of the noses 80 relative to the support plate 44 can be between 15 and 80% of the height of the locking ring 24 relative to the support plate 44.

In this connection it should be noted that an inlet opening of the inlets 28 is recessed relative to the rear end 13, 13' of the inlet part 26, 26". A distance by which the inlet openings are recessed with respect to the rear end 13, 13' can be between 10 and 50% of a height of the inner surface 52 of the sleeve 48.

Figure 7:
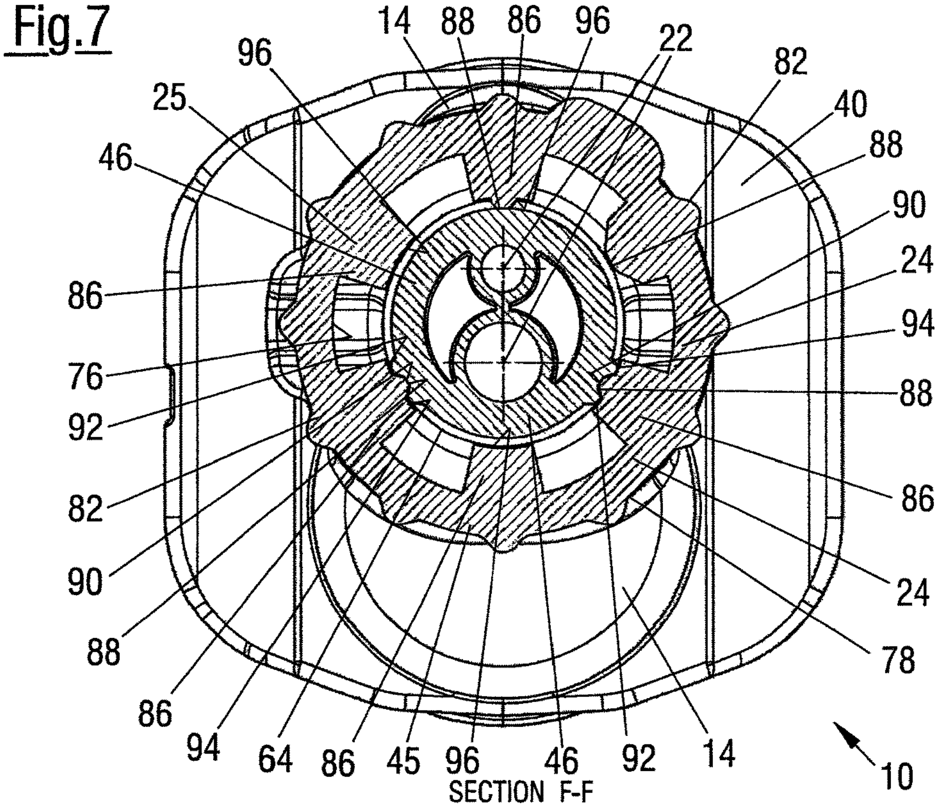
FIG. 7 is a part sectional view taken along the sectional line F-F of FIG. 5.

FIG. 7 shows a part sectional view taken along the sectional line F-F of FIG. 5. The inwardly projection lip 25 of the locking ring 24 is formed by race elements 86 which engage the rear end 45 of the collar 46 between the plate 38 and the support plate 44.

Some of the race elements 86 comprise projections 88, 92, 94 at an axial inner surface 96 of the race elements 86. The projections 88, 92, 94 are configured to engage second grooves 90 present at the outer surface 64 of the collar 46.

The projections 88 and grooves 90 are spaced apart by 120° relative to one another. This corresponds to a third of a turn of the locking ring 24 about the longitudinal axis A. On rotating the locking ring 24 relative to the collar 46 by one third of a turn, the locking ring 24 and hence the inlet part 26 can be moved from an unlocked position in which the inlet part 26 can be removed from the outlet part 20 into a locked position in which the inlet part 26 is latched to the outlet part 20.

On rotating the locking ring 24 from the locked position into the unlocked position the inlet part 26 is not only unlatched from the outlet part 20, but is also moved axially in the direction of the longitudinal axis away from the cartridge 14. This is particularly beneficial when mastic components are stored in the cartridge 14, since these may cause the inlets 28 to be bonded to the outlets 22. The force applied on the inlet part 26 can cause this bond to be broken and hence a more simplified removal of the static mixer 12.

FIG. 8 shows a sectional view along the sectional line E-E of FIG. 5. In this drawing the discharge arrangement 10 is present in the locked position, i.e. the rear end 13 of the static mixer 12 is pushed as far into the space between the locking ring 24, the support 44 and the collar 46 as possible.

FIG. 9 shows a sectional view similar to that of FIG. 5, with the mixer 12 detached from the cartridge 14, i.e. in the completely unlocked position, in which the inlet part 26 is not in contact with the outlet part 22.

Figure 10:
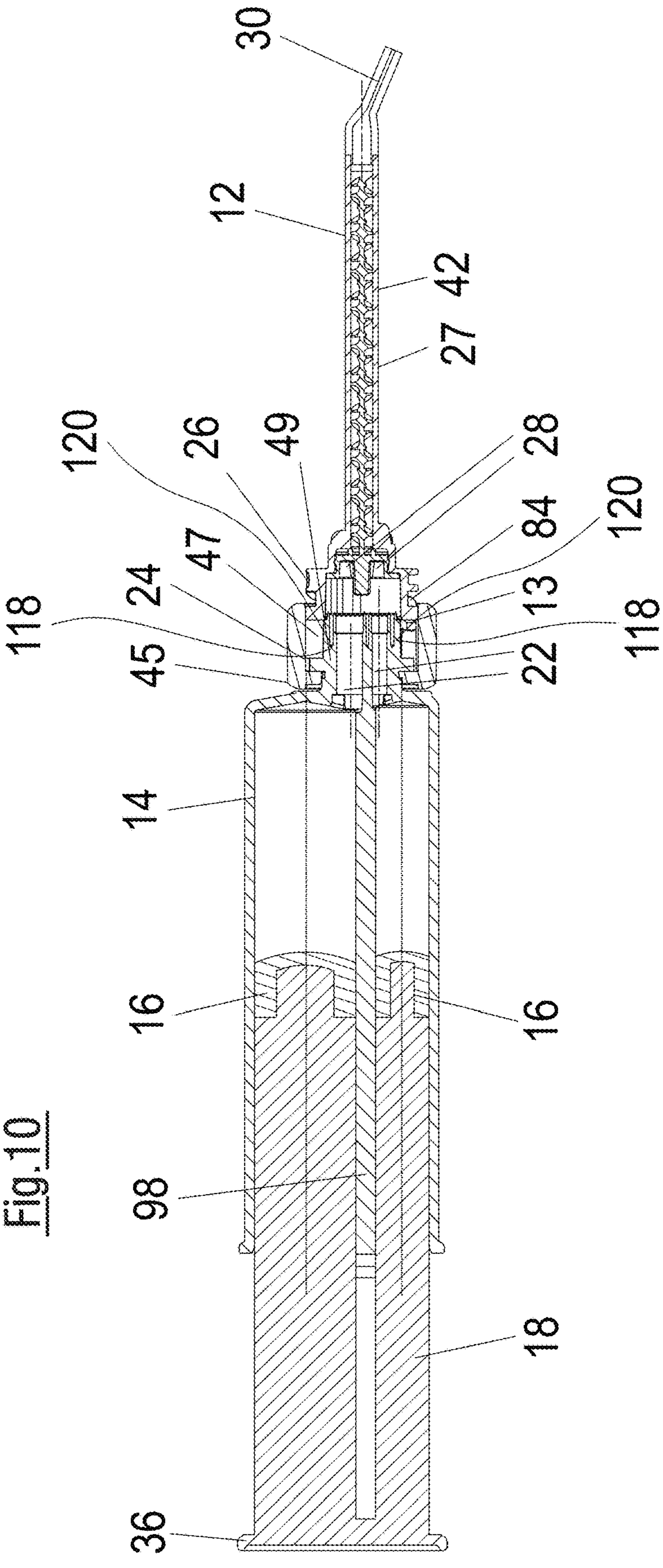
FIG. 10 is a sectional view similar to that of FIGS. 5 and 10, with a mixer partly attached at the cartridge.

FIG. 10 shows a sectional view similar to that of FIGS. 5 and 10, with the mixer 12 partly attached to the cartridge 14, i.e. in the unlocked position, in which the inlet part 26 is not fully received in the space between the locking ring 24, the support plate 44 and the collar 46 in contrast to that shown in FIG. 8.

Figure 11:
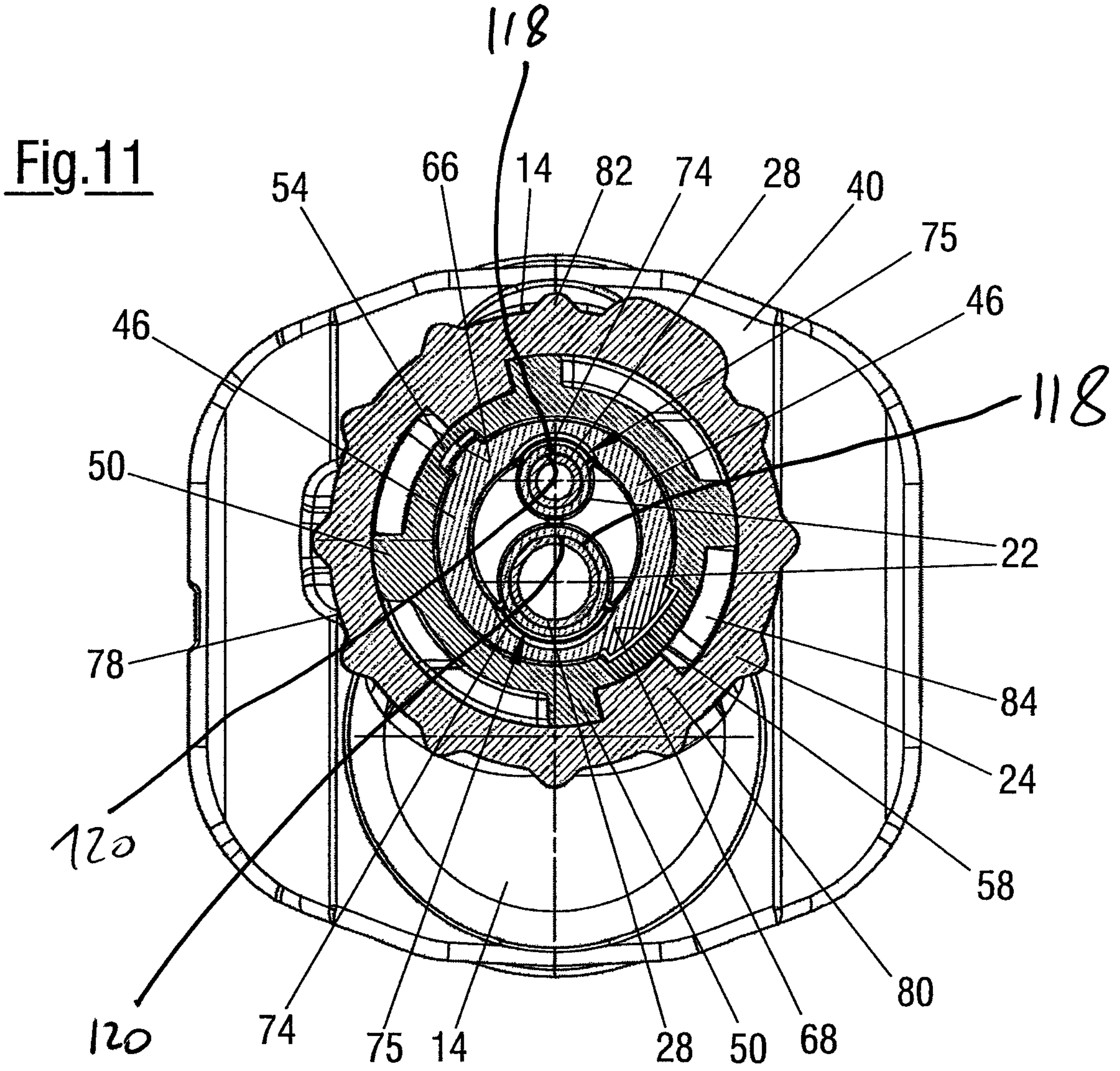
FIG. 11 is a sectional view similar to that of FIG. 6 through a second type of mixing tip.

FIG. 11 shows a sectional view similar to that of FIG. 6 through a second type of discharge arrangement 10. In this embodiment, the inlet part 26 comprises first and second recesses 54, 58 that engage respective first and second projections 66 and 68 present at the collar 46 of the outlet part 20.

It should be noted that the outer surface of the collar 46 can simply comprise recesses and the inner surface of the inlet part 26 can comprise projections which are configured to engage the recesses.

In this connection it should be noted that the outer surface 64 of the collar 46 can also comprise one or more projections 66, 68, one or more recesses 70, an undulating surface 64, a cylindrical outer shape 64, a non-cylindrical outer shape 64, an oval outer shape, a rectangular outer shape, a square outer shape a polygonal outer shape and combinations of the foregoing forming the first rotation constraining member (first rotation constrainer) 64, 66, 68, 70.

In this connection it should also be noted that the inner surface 52 of the sleeve 48 can comprise one or more projections, one or more webs 60, one or more recesses, an undulating surface, a non-cylindrical outer shape, an oval outer shape, a rectangular outer shape, and combinations of the foregoing forming the second rotation constraining member (second rotation constrainer) 54, 56, 58, 60.

Figure 12:
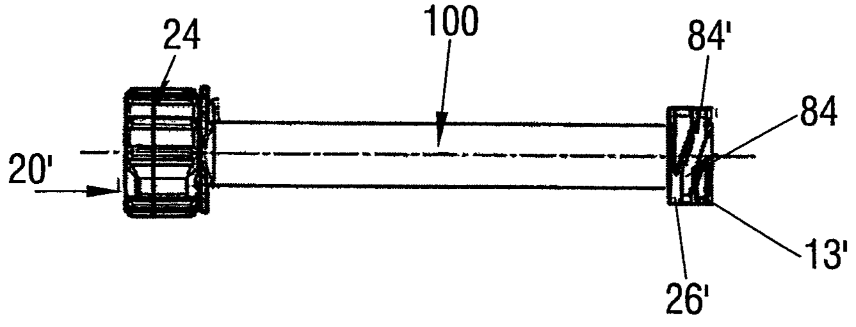
FIG. 12 is a schematic view of an extension.

FIG. 12 shows a schematic view of an extension 100. The extension 100 comprises an outlet part 20' and an inlet part 26'. The outlet part 20' can be configured in the same or similar way to the outlet part 20 of the cartridge discussed in the foregoing.

Figure 13:
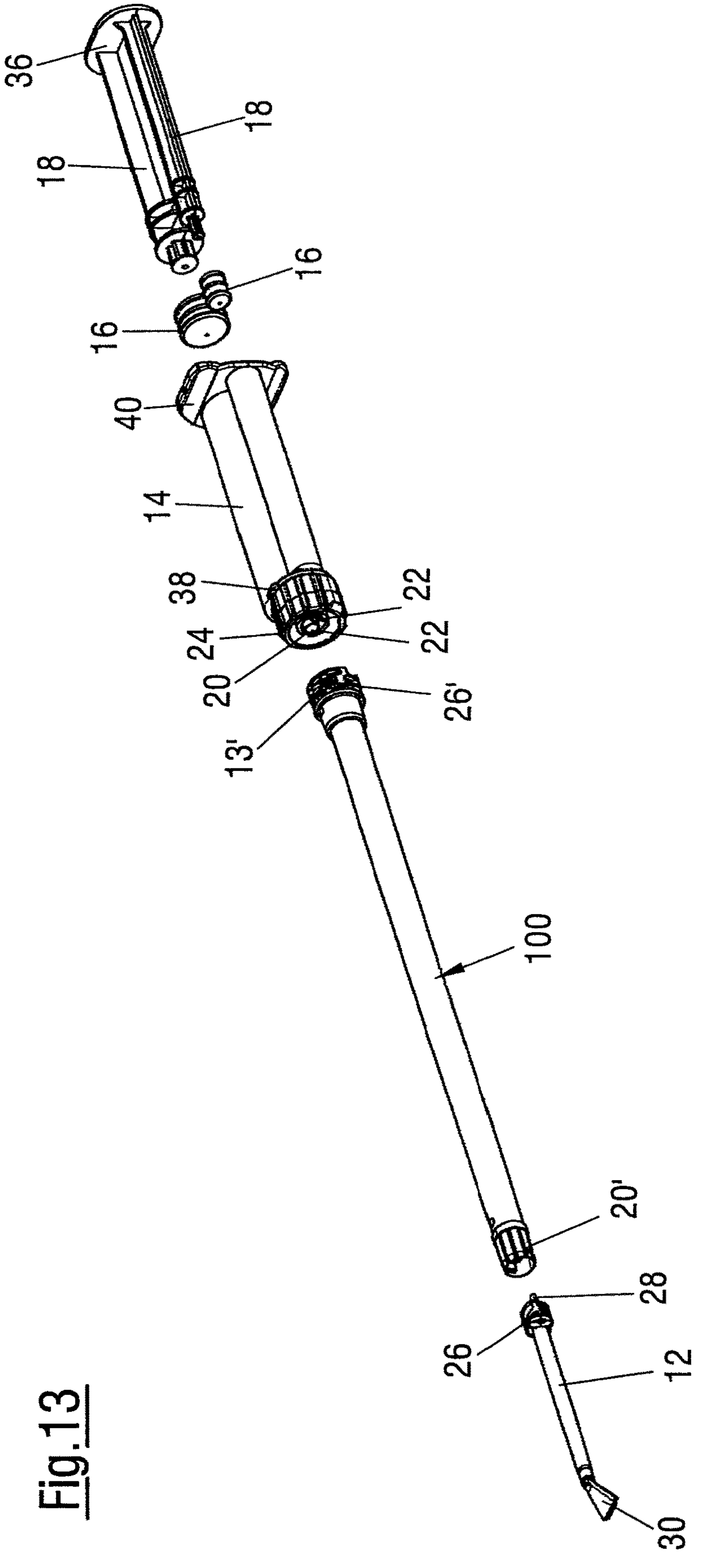
FIG. 13 is an exploded view of components of a system for treating patients during medical procedures carried out in the region of the intestine.
Figure 14M:
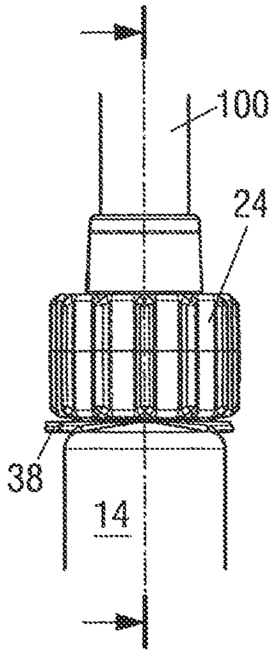
FIGS. 14A-14O visualize different stages of connecting an extension to a cartridge.
Figure 14N:
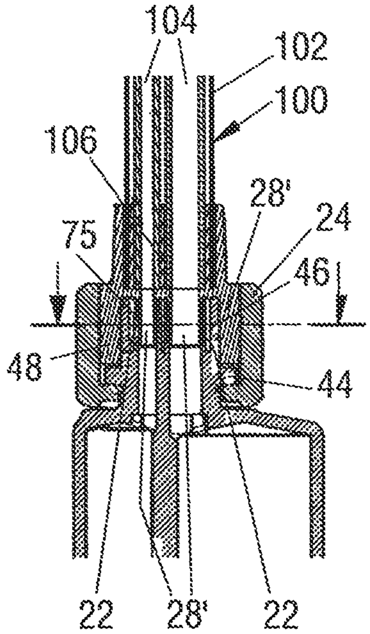
Figure 14O:
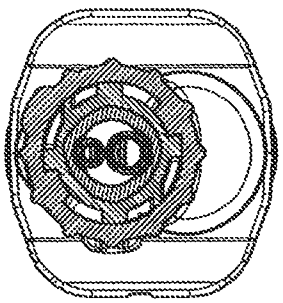

Similarly and as shown in FIGS. 13 to 14O the inlet part 26' can be configured in the same or similar way to the inlet part 26 of the static mixer 12 discussed in the foregoing.

The extension 100 is typically attached to the cartridge 14 when a distance between the outlet part 20 of the cartridge and the dispensing outlet 30, 30' of the static mixer 12, 12' has to be extended, e.g. to access positions within cavities.

FIG. 13 shows an exploded view of components of a system for treating patients during medical procedures carried out in the region of the intestine. The system comprises the static mixer 12, the extension 100, a cartridge 14 and its pistons 16 and plungers 18.

FIGS. 14A-14O show the various stages on connecting the extension 100 to the cartridge 14. In this connection it should be noted that the same or similar steps are carried out on connecting the static mixer 12 directly to the cartridge 14, the static mixer 12 to the extension 100, a cap 108 (see FIGS. 17 to 19B) to the cartridge 14, and the cap 108 to the extension 100.

Prior to connecting the extension 100 to the cartridge 14, a user of the components places the inlet part 26' of the extension 100 adjacent to the outlet part 20 of the cartridge 14, as shown in FIGS. 14A-14O, the components are not aligned relative to one another at this moment in time.

Following this the rear end 13' of the extension 100 is placed at the outlet part 20 within the locking ring 24 directly adjacent to the front end 47 of the collar 46. The inlet part 26' can be rotated within the locking ring 24 until the first rotation constraining members of the collar 46 axially align with the second constraining member as indicated in FIGS. 14D-14F.

Once the first and second constraining members are aligned, the rear end 13 of the sleeve 48 of the inlet part 26' can be moved axially towards the nose 80 into the space between the collar 46 and the locking ring 24. Thereby the inlets 28' are brought into engagement with the outlets 22 prior to the inner and outer threads 80, 84' engaging one another as indicated in FIGS. 14G-14I.

Once the nose 80 engages the channel 84 of the outer thread 84' the locking ring 24 can be rotated relative to the inlet part 28'. Thereby the inlet part 28' can be moved further axially towards the support plate 44 as indicated in FIGS. 14J-14L until the locking ring 24 has been rotated completely, e.g. by a quarter of a turn, a third of a turn or a half of a turn of the locking ring 24, such that the inlet part 28' is latched to the outlet part 20 via the locking ring and the inlet part 28' is in the locked position as indicated in FIGS. 14M-14O.

As further indicated in FIGS. 14A-14O, the outer surface of the collar 46 has an outer surface 64 that is of non-uniform outer shape and is free of projections or recesses. Moreover, the inner surface 56 of the sleeve 48 is also of non-uniform inner shape and is free of projections or recesses, with the shape of the outer surface 64 being complementary to the shape of the inner surface 56, so that the inner surface 56 is inhibited from being rotated relative to the outer surface 64 when the inlet part 26' is placed over the collar 46 of the outlet part 20.

The provision of rotation constraining members on both the outer surface 64 of the collar 46 and on the inner surface 56 of the sleeve 48 prevents a rotation of the respective inlet part 26, 26" relative to the respective outlet part 20, 20', such that no torque can be transferred to the inlets 28, 28' and outlets 22 which could cause these to be deformed and hence become inoperable.

The non-uniform outer and inner shapes of the collar 46 and of the sleeve 48 is provided by an oval outer shape of the collar 46 and an oval inner shape of the sleeve 48 in the examples shown in FIGS. 14A to 19D.

The outer surface 52 of the sleeve 48 is still generally circular, with cut outs present at the entrance to the channel 84 forming the outer thread 84'. This circular outer shape of the sleeve 48 permits the inlet part 26, 26' to be rotated relative to the locking ring 24 and the outlet part 20, 20' prior to the sleeve being introduced into the space formed between the locking ring 24 and the collar 46, for the purpose of axial alignment of the first and second rotation constraining members.

In this connection it should be noted that the outer surface 52 of the inlet part 26; 26'; 26" of the accessory 12; 12'; 100; 108 is the outer surface 52 of the sleeve 48.

As can further be seen in FIGS. 9, 10 and 14A to 14O the locking ring 24 has a first end projecting in the direction of the outlets 22, 22' away from the fluid conducting components 14, 100, i.e. the cartridge 14, and the extension 100, with the two or more outlets 22, 22' being arranged closer towards the fluid conducting component (fluid conductor) 14, 100 than the first end of the locking ring 24. Similarly the sleeve 48 comprises the front end 49 and the rear end 13, with the front end 49 being arranged furthest away from the outlet 30, 30'; 22' of the accessory 12; 12'; 100; 108, with the inlets 28; 28'; 110 (see FIG. 17) being arranged closer towards the outlet 30, 30'; 22' than the front end.

Figure 15A:
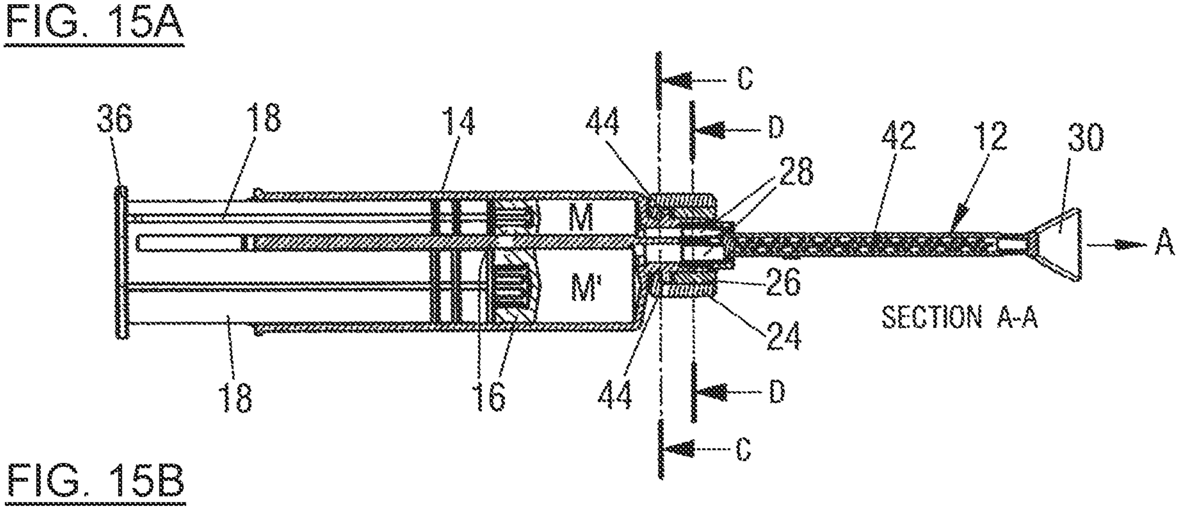
FIGS. 15A and 15B are sectional views similar to FIGS. 5 and 10 of a further discharge arrangement having a different connection interface.
Figure 15B:
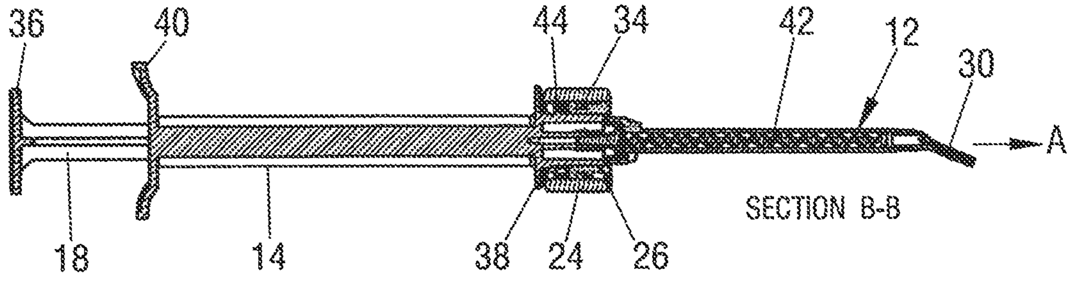

FIGS. 15A and 15B show sectional views similar to those of FIGS. 5 and 10 of a further discharge arrangement 10 having a different connection interface to that shown in FIGS. 5 and 10. The discharge arrangement 10 of FIGS. 15A and 15B comprises the inlet part 26' and the outlet part 20 shown in FIGS. 14A to 14O. FIG. 15A shows the discharge arrangement 10 in the locked position, in which a fluid communicating connection is present between the cartridge chambers 32, 32' and the mixing element 42. FIG. 15B shows the discharge arrangement 10 in the same position in which one can see the flowpath between the cartridge chambers 32, 32', the outlets 22 and inlets 26 and the mixing element 42, with the two flow paths being separated from one another up until the materials reach the mixing element 42.

FIGS. 16A and 16B are sectional views similar to FIGS. 6 and 7 of the further connection interface of FIGS. 14A to 14O and 15A and 15B. FIG. 16A is identical to the drawing shown in FIG. 7, whereas FIG. 16B shows the inlet part 26" of the extension present in the outlet part 20 of the cartridge 14.

The non-uniform outer and inner shapes of the collar 46 and of the sleeve 48 is provided by the oval outer shape of the collar 46 and an oval inner shape of the sleeve 48 which deviates from a cylindrical inner and outer shape and thereby inhibits the possibility of rotating the inlet part 26' relative to the outlet part 20 to form the first and second rotation constraining members.

FIG. 17 shows an exploded view of components of the cartridge 14 and the cap 108 installed at the outlet part 20 of the cartridge 14 to seal off the outlets 22 of the cartridge 14 While this is not in use. The cap 108 comprises an inlet part 26", that can be designed in a similar way to the inlet parts 26, 26' shown in the foregoing, As indicated in FIGS. 18 A, 18B and 18C, the difference between the cap 108 and the static mixer 12, 12' or the extension 100 respectively is that the two or more inlets of the cap are formed as two or more plugs 110. In order to seal the outlets 22 in a superior manner in contrast to when a mixer 12, 12' or an extension 100 is connected to the outlets 22, the plugs 110 are formed longer than a respective one of the inlets 28 of the static mixer 12, 12' and of the extension 100.

FIGS. 18 A, 18B and 18C show further views of the cap 108 of FIG. 17 connected to the cartridge 14. The cap 108 further comprises a handle 112 via which the cap 108 can be removed from the outlet part 20, 20' or inserted into the outlet part 20, 20'. Within the sleeve 48 of the inlet part 26" a web 114 can be seen which connects the plugs 110 and thereby provides axial stability to the plugs 110. A similar web 114 can be provided at the inlet parts 26, 26' in order to add further stability to the respective inlets 28 shown there.

FIGS. 19A-19D show further views of a cartridge 14 and a cap 108, with yet a further design of the connection interface formed by the outlet part 20, and the inlet part 26". The collar 46 comprises the same oval outer shape as discussed, e.g. in connection with FIGS. 14A-14O and further comprises a cylindrical ridge 116 extending from a front end of the collar 46 in the direction of the outlets 22, 22', with a rear end of the collar 46 being attached to the fluid conducting component 14, 100.

The ridge 116 enables an improved alignment of the inlet part 26" relative to the outlet part 20 while preventing the inlets 28 from coming into contact with the outlets 22. This is because the oval shape of the collar 46 is not yet aligned with the oval shape of the inner surface of the sleeve 48 an axial movement towards the cartridge 14 is prevented. In order to reach the axial alignment the inlet part 26" can be rotated relative to the outlet part 20 with the ridge 116 acting as an aid guiding the rotation of the inlet part 26" until the axial alignment is achieved.

In the foregoing various discharge arrangements for multi-component material M, M', have been shown with the discharge arrangement comprising a fluid conducting component 14, 100 having an outlet part 20; 20', an accessory 12; 12'; 100; 108 having an inlet part 26; 26'; 26", and a locking ring 24, the inlet part 26; 26'; 26" of the accessory 12; 12'; 100; 108 being releasably attachable to the outlet part 20; 20' of the fluid conducting component 14, 100.

The outlet part 20; 20' respectively comprises two or more outlets 22, 22' surrounded by the collar 46, with the outer surface 64 of the collar 46 comprising a first rotation constraining member 64, 66, 68, 70. The inlet part 26; 26'; 26" comprises two inlets 28; 28'; 110 surrounded by the sleeve 48, with the two inlets 28; 28'; 110 being configured complementary to the two outlets 22, 22' of the fluid conducting component 14, 100 for a coupling of the outlets 22, 22' to the inlets 28; 28'; 110 to enable a fluid communication between a respective one of the outlets 22, 22' with a respective one of the inlets 28; 28'; 110.

The inner surface of the sleeve 48 comprises a second rotation constraining member 54, 56, 58, 60, with the first and second rotation constraining members 54, 56, 58, 60 being formed complementary to one another to inhibit a rotation of the inlet part 26; 26'; 26" relative to the outlet part 20; 20'.

The locking ring 24 is fixedly arranged at the outlet part 20; 20' and is configured to releasably lock the fluid conducting component 14, 100 to the accessory 12; 12'; 100; 108 by engaging an outer surface 52 of the inlet part 26; 26'; 26" of the accessory 12; 12'; 100; 108.

The fluid conducting component 14, 100 is one of the cartridge 14 and the extension 100. The accessory can be one of the extension 100, the cap 108 and the static mixer 12, 12'.

On connecting the accessory 12; 12'; 100; 108 to the outlet part 20; 20' of the discharge arrangement, the following steps are carried out:

- the inlet part 26; 26'; 26" of the accessory 12; 12'; 100; 108 is aligned relative to the outlet part 20; 20';
- the inlet part 26; 26'; 26" is then inserted into the outlet part 20; 20';
- whereby the inlet part 26; 26'; 26" is rotationally fixed relative to the outlet part 20; 20' by means of the first and second rotation constraining members; and
- then the locking ring 24 is rotated to axially shift the inlet part 26; 26"; 26" further towards the outlet part 20; 20' and to latch the inlet part to the outlet part 20; 20'.

By providing a fluid conducting interface in which the inlets 28, 28' and the outlets 22 do not contact one another until the inlet part 26, 26', 26" is aligned relative to the outlet part 20, 20', a cross-contamination between inlets and outlets is avoided, whereby the lifetime of contents stored e.g. in the cartridge can be reliably maintained.

The inlet parts 26, 26', 26" and outlet parts 20, 22' are thus part of a connecting system having centering, coding and positioning elements comprising a first connecting component 26, 26', 26", which is arranged on the accessory 12, 12', 100, 108, and a second connecting component 20, 20', which is complementary to the first connecting component and is arranged on the cartridge 14, wherein one of the connecting components comprises a socket part and the other connecting component comprises a connector part that is adapted to be inserted into the socket along a longitudinal direction, wherein one of the connecting components comprises a first engagement part of a coding element and the other connecting component comprises a second engagement part of the coding element.

The coding element allows only one of the inlets 28 to be plugged into one of the outlets 22. A first engagement part of a centering guide is provided on one of the connecting components, and a corresponding second engagement part of the centering guide is provided on the other connecting component. The connecting components are adapted to be rotated into each other over an effective connecting section along the rotational guide after the connector part has been plugged into the socket, and wherein the connecting components are adapted to be brought increasingly into engagement with each other while being guided in the axial direction and to be disengaged from each other while being guided over an effective connecting section in the axial direction, such that, when the connection is established, the accessory is positively guided towards the cartridge or the extension, and such that, when the connection is released, the accessory 12, 12', 100, 108 is lifted from the cartridge 14 or the extension in a positively guided manner.

It should further be noted that the outlet openings 23 of the outlets 22 of the cartridge 14 or of the extension 100 and hence the inlet openings of the respective inlets 28 of the accessory 12, 12', 100, 108 can be of equal size.

Alternatively one of the outlets 22 can be larger than the other one of the outlets 22 and hence one of the inlets 28 can be larger than the other one of the inlets. In this connection one outlet opening 23 can be between 10 and 300% larger than the other outlet opening 23, Similarly one of the inlets 28 can be between 10% and 300% larger than the other one of the inlets 28 of the respective accessory 12, 12', 100, 108.

It should further be noted that the two inlets 28, 28', 110 of the respective inlet part 26; 26'; 26" can comprise a sealing surface 120 which is configured to seal with respect to an inner surface 118 of the respective outlet 22, 22' of the fluid conducting component 14, 100 for a coupling of the outlets 22, 22' to the inlets 28; 28'; 110.

The respective sealing surface 120 can be is configured to seal with respect to the respective inner surface 118 over a length selected in the range of 5% to 60%, in particular in the range of 10% to 40%, especially in the range of 15 to 30%, of the respective outlet 22, 22'. In this connection it should be noted that a length of the respective outlet 22, 22' is defined as that part of the outlet in which an inner diameter of the outlet 22, 22' starting from the outlet opening 23 changes by at most 10% and is preferably uniform.

The invention claimed is:

1. A discharge arrangement for multi-component material, the discharge arrangement being configurable in a detached configuration and in an attached configuration, the discharge arrangement comprising:

a fluid conducting component having an outlet part and a locking ring being disposed on and fixedly arranged to the outlet part in the detached configuration; and an accessory having an inlet part, and in the detached configuration the accessory is detached from the fluid conducting component;

in the attached configuration the inlet part of the accessory being releasably attached to the outlet part of the fluid conducting component, the outlet part comprising two or more outlets surrounded by a collar, with an outer surface of the collar comprising a first rotation constraining member, the inlet part comprising two inlets surrounded by a sleeve, the two inlets being configured complementary to the two outlets of the fluid conducting component to couple the two or more outlets to the two inlets to enable fluid communication between a respective one of the outlets with a respective one of the two inlets, with an inner surface of the sleeve comprising a second rotation constraining member, the first and second rotation constraining members are formed complementary to one another to inhibit a rotation of the inlet part relative to the outlet part, and the locking ring configured to releasably lock the fluid conducting component to the accessory in the attached configuration by moving the locking ring relative to an outer surface of the inlet part of the accessory and engaging the outer surface of the inlet part of the accessory.

2. The discharge arrangement in accordance with claim 1, wherein the first rotation constraining member is formed by the outer surface of the collar being non-uniform shaped.

3. The discharge arrangement in accordance with claim 1, wherein the second rotation constraining member is formed by a non-uniform shaped inner surface of the sleeve.

4. The discharge arrangement in accordance with claim 1, wherein an inner surface of the sleeve is complementary to the outer surface of the collar.

5. The discharge arrangement in accordance with claim 1, wherein the outer surface of the collar comprises one or more projections, one or more recesses, an undulating surface, a cylindrical outer shape, a non-cylindrical outer shape, an oval outer shape, a rectangular outer shape, a square outer shape, a polygonal outer shape or combinations of the foregoing to form the first rotation constraining member.

6. The discharge arrangement in accordance with claim 1, wherein an inner surface of the sleeve comprises one or more projections, one or more webs, one or more recesses, an undulating surface, a non-cylindrical outer shape, an oval outer shape, a rectangular outer shape, or combinations of the foregoing to form the second rotation constraining member.

7. The discharge arrangement in accordance with claim 1, wherein an inner surface of the locking ring faces the outer surface of the collar, with the inner surface comprising one or more members of an inner thread, one or more members of a plug and release type connector, one or more members of a bayonet type of connector or one or more noses.

8. The discharge arrangement in accordance with claim 7, wherein the outer surface of the inlet part of the accessory faces the inner surface of the locking ring, with the outer sur-face of the inlet part comprising one or more members of an outer thread, one or more members of a plug and release type connector, one or more members of a bayonet type of connector, one or more noses or one or more grooves.

9. The discharge arrangement in accordance with claim 1, wherein the outer surface of the inlet part of the accessory is an outer surface of the sleeve.

10. The discharge arrangement in accordance with claim 1, wherein the collar comprises a ridge extending from a front end of the collar in a direction of the two or more outlets and the ridge is a cylindrical ridge, with a rear end of the collar being attached to the fluid conducting component.

11. The discharge arrangement in accordance with claim 1, wherein the locking ring has a first end projecting in a direction of the two or more outlets away from the fluid conducting component, with the two or more outlets being arranged closer towards the fluid conducting component than the first end of the locking ring.

12. The discharge arrangement in accordance with claim 1, wherein the sleeve comprises a front end and a rear end, with the front end being arranged furthest away from an outlet of the accessory, with the two inlets being arranged closer towards the outlet of the accessory than the front end of the sleeve.

13. An arrangement in accordance with claim 1, wherein the two inlets of the inlet part comprise a sealing surface configured to seal with respect to an inner surface of a respective outlet of the two or more outlets of the fluid conducting component to couple the two or more outlets to the two inlets.

14. The arrangement in accordance claim 13, wherein for each of the two inlets, a respective sealing surface is configured to seal with respect to the inner surface of the respective outlet of the two or more outlets over a length selected in the range of 5% to 60.

15. The arrangement in accordance with claim 13, wherein the accessory comprises a housing configured to connect to the inlet part, at least one of the housing and the inlet part comprises one or more anti-rotation members to inhibit rotation between the housing and the inlet part.

16. An arrangement in accordance with claim 15, wherein the one or more anti-rotation members is disposed on the housing and the inlet part includes one or more anti-rotation members, the one or more anti-rotation member of the housing being formed complementary to the one or more anti-rotation members of the inlet part.

17. The arrangement in accordance with claim 16, wherein the one or more anti-rotation members of the housing are formed at an end of the housing adjacent to the inlets of the inlet part.

18. The arrangement in accordance with one of claims 15, wherein the one or more anti-rotation members includes between two and twelve anti-rotation members.

19. A method of assembling a discharge arrangement according to claim 1, the method comprising:

aligning the inlet part of the accessory relative to the outlet part of the fluid conducting component;

inserting the inlet part of the accessory into the outlet part of the fluid conducting component;

rotationally fixing the inlet part of the accessory relative to the outlet part of the fluid conducting component; and rotating the locking ring to axially shift the inlet part of the accessory towards the outlet part of the fluid conducting component and to latch the inlet part of the accessory to the outlet part of the fluid conducting component.

* * * * *